US009720396B2

(12) United States Patent
Law et al.

(10) Patent No.: US 9,720,396 B2
(45) Date of Patent: Aug. 1, 2017

(54) METHODS AND APPARATUS TO CONFIGURE PROCESS CONTROL SYSTEMS BASED ON GENERIC PROCESS SYSTEM LIBRARIES

(71) Applicant: Fisher-Rosemount Systems, Inc., Round Rock, TX (US)

(72) Inventors: Gary Law, Georgetown, TX (US); Brandon Hieb, Cedar Park, TX (US); Ram Ramachandran, Austin, TX (US); Julian Kevin Naidoo, Cedar Park, TX (US); Larry Oscar Jundt, Round Rock, TX (US); David R. Denison, Austin, TX (US); John Michael Lucas, Leicester (GB); Alper Enver, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 433 days.

(21) Appl. No.: 14/286,436

(22) Filed: May 23, 2014

(65) Prior Publication Data

US 2015/0338836 A1 Nov. 26, 2015

(51) Int. Cl.
*G05B 19/05* (2006.01)
*G05B 19/042* (2006.01)

(52) U.S. Cl.
CPC ....... *G05B 19/056* (2013.01); *G05B 19/0426* (2013.01); *G05B 2219/1144* (2013.01);
(Continued)

(58) Field of Classification Search
CPC .............. G05B 19/056; G05B 19/0426; G05B 2219/1144; G05B 2219/14095; G05B 2219/32129
See application file for complete search history.

(56) References Cited

U.S. PATENT DOCUMENTS

| 7,702,409 B2* | 4/2010 | Lucas | ............... G05B 19/0426 700/18 |
| 8,074,278 B2* | 12/2011 | Law | .................. G05B 19/0426 713/188 |

(Continued)

OTHER PUBLICATIONS

Bela Liptak, General Considerations, 2003, 30 pages.*

(Continued)

*Primary Examiner* — Sean Shechtman
*Assistant Examiner* — Tri T Nguyen
(74) *Attorney, Agent, or Firm* — Hanley, Flight & Zimmerman, LLC

(57) ABSTRACT

Methods and apparatus to configure process control systems based on generic process system libraries are disclosed. An example method includes instantiating an instance of a generic process system library. The instance is associated with items of equipment and corresponding process signals of a process control system. The generic process system library comprises at least one of generic process graphic data or generic control strategy data corresponding to the items of equipment and the corresponding process signals of the process control system. The example method further includes configuring the instance of the generic process system library by incorporating process-specific data associated with the operation of the process control system with the at least one of the generic process graphic data or the generic control strategy data.

20 Claims, 14 Drawing Sheets

(52) U.S. Cl.
CPC .............. *G05B 2219/14095* (2013.01); *G05B 2219/32129* (2013.01)

(56) References Cited

U.S. PATENT DOCUMENTS

| | | | |
|---|---|---|---|
| 9,256,219 B2* | 2/2016 | Blevins | G05B 19/0426 |
| 2004/0153804 A1* | 8/2004 | Blevins | G05B 15/02 |
| | | | 714/33 |
| 2005/0050515 A1* | 3/2005 | Shah | G06F 11/323 |
| | | | 717/113 |
| 2005/0222698 A1 | 10/2005 | Eryurek et al. | |
| 2005/0257204 A1 | 11/2005 | Bryant et al. | |
| 2008/0189441 A1 | 8/2008 | Jundt et al. | |
| 2009/0228310 A1 | 9/2009 | Zayic | |
| 2011/0230980 A1* | 9/2011 | Hammack | G05B 19/409 |
| | | | 700/17 |
| 2014/0100668 A1 | 4/2014 | Jundt et al. | |

OTHER PUBLICATIONS

Intellectual Property Office of Great Britain, "Search Report under Section 17(5)", issued in connection with British patent application No. GB1507793.6, mailed on Nov. 16, 2015, 4 pages.

\* cited by examiner

METHODS AND APPARATUS TO CONFIGURE PROCESS CONTROL SYSTEMS BASED ON GENERIC PROCESS SYSTEM LIBRARIES

FIELD OF THE DISCLOSURE

This disclosure relates generally to process control systems and, more particularly, to methods and apparatus to configure process control systems based on generic process system libraries.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to otherwise manage the operation of the process control system.

SUMMARY

Methods and apparatus to configure process control systems based on generic process system libraries are disclosed. An example method includes instantiating an instance of a generic process system library. The instance is associated with items of equipment and corresponding process signals of a process control system. The generic process system library comprises at least one of generic process graphic data or generic control strategy data corresponding to the items of equipment and the corresponding process signals of the process control system. The example method further includes configuring the instance of the generic process system library by incorporating process-specific data associated with the operation of the process control system with the at least one of the generic process graphic data or the generic control strategy data An example tangible computer readable storage medium comprising instructions is disclosed that, when executed cause a machine to at least instantiate an instance of a generic process system library. The instance is associated with items of equipment and corresponding process signals of a new process control system. The generic process system library is based on a previously configured process control system. At least some equipment of the previously configured process control system is to be the same as the items of equipment of the new process control system. The example instruction, when executed, further cause the machine to configure the instance to operate the items of equipment of the new process control system.

An example apparatus is disclosed that includes a generic library database to store a generic process system library. The generic process system library comprises generic graphics data and generic control strategy data corresponding to a process control system. The example apparatus further includes an instance generator to generate an instance of the generic process system library by incorporating process-specific data associated with the process control system with the generic graphics data and generic control strategy data.

DETAILED DESCRIPTION

Figure 1:
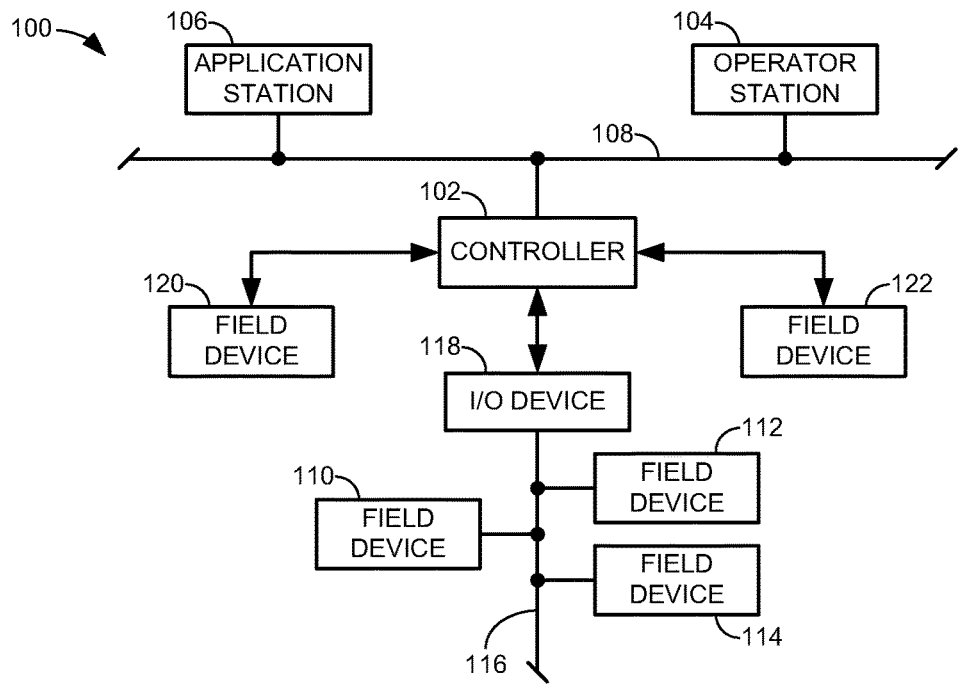
FIG. 1 is a schematic illustration of an example process control system within which the teachings of this disclosure may be implemented.

Typically, to facilitate the configuration of a process control system, configuration engineers use field device tags corresponding to each of the field devices within a process control system. A field device tag is a logical entity that includes the type of the field device and/or an assigned name (i.e., a tag) that uniquely identifies each field device. Such field device tag names are used to define the relationships of different field devices and their corresponding control parameters within control modules of an overall control strategy for a process control system and to associate or bind the logical control strategy with the corresponding field devices as physically connected in the process control system. More particularly, engineers typically configure a process control system by appropriately connecting the physical field devices and assigning each of the field devices with a suitable tag name. In connection with the physical configuration of the process control system, the engineers use the field device tags to individually assign input and/or output blocks of control modules to each of the field devices to configure the control strategy used to implement the process control system. By individually assigning the tags to the control modules, the logical control strategy is bound to the physical equipment to enable control of the process control system.

Once a process control system is configured as described above, the process system may be put into operation. In many instances, to assist operators, engineers, and/or other plant personnel in monitoring and/or controlling the process system in operation, the process control system and/or components thereof (e.g., individual units, areas, equipment modules, etc.) are represented graphically through a piping and instrumentation diagram (P&ID) and/or other process graphic. Accordingly, in some examples, the configuration process also includes creating and configuring process graphics for the process control system. Frequently, configuration engineers create such process graphics by combining graphical elements representative of the different field devices and equipment within the process control system and individually assigning the corresponding field device tags to the respective graphical elements. In this manner, the physical field devices and the control strategy, which are associated via the tags, are also linked to the process graphics such that information generated from the field devices and/or based on the control strategy (e.g., values of process parameters and/or signals) may be displayed within the process graphic at the appropriate location alongside the graphical representations of the corresponding equipment.

The configuration process of defining tags for each field device in a process control system, associating each tag with corresponding control modules, and associating the tags with corresponding graphical elements in a process graphic can be time intensive and laborious. Furthermore, many process control systems include process units, cells, areas, or other components that contain similar or comparable equipment configured in a similar or comparable manner as other units, cells, areas, or other components of a process control system. As used herein, the terms "similar" or "comparable" are expressly defined to mean the same or substantially the same. For example, a process control system may have two separate boiler units that each contain comparable (e.g., the same or substantially the same) equipment and corresponding process signals configured in a comparable (e.g., the same or substantially the same) manner. As a result, the physical layout of each unit and the interactions of the equipment in each unit (e.g., the functional operation(s)) will be the same or substantially the same. However, because the specific field devices in each of the comparable components of the process control system are associated with different, unique tags, each of the similar components is separately configured. To use the boiler example, a first boiler system may include devices with tags including a 1 to indicate an association with boiler 1, whereas the comparable devices in a second boiler system may have tags including a 2 to indicate an association with boiler 2. Thus, although the systems associated with boiler 1 and boiler 2 are comparable, each boiler system must be separately configured because each has different tags for the devices corresponding to each boiler system. Additionally, a process system may be used at different times for different projects. However, tags are typically project-specific such that the configuration of the process system for a particular project will be completely redone even though an earlier project used the same or comparable process system with different tags assigned to the devices. As such, in many instances, the time consuming nature of configuring a process control system may involve a lot of repetition of steps wherein configuring comparable process control systems.

In examples disclosed herein, the time consuming nature of process configuration is reduced significantly through the use of generic process system libraries and/or generic library definitions that can generically apply to multiple comparable process control systems or components thereof. In this manner, generic process system libraries and/or generic library definitions may be used or reused to configure multiple process control systems or components thereof that are comparable without having to reconfigure the common aspects of each such comparable process system or components thereof. For purposes of this disclosure, the term "component" of a process control system may refer to an entire process control system or a portion of the process control system such as a plant, an area, a unit, a process cell, an equipment module, a control module, a skid, a toolkit, or any other suitable division. Furthermore, as used herein, references to a process control system include safety instrumented systems (SIS).

More particularly, a "generic process system library" as used herein refers to a generic hierarchical library of data and information associated with a process control system or component thereof. A generic process system library is generic because it contains only the information that is common or generic to the multiple control systems to which it applies while the process-specific and project-specific details have been removed or abstracted out. A generic process system library is hierarchical because the generic data and information is organized and stored based on an equipment hierarchy of the process control system. A generic process system library may include generic process graphics and/or generic control strategies corresponding to the equipment and corresponding control signals in a process control system or a component thereof. That is, in some examples, a generic process system library includes information that indicates the presence or availability of physical equipment and corresponding control parameters and/or signals within a process control system without specifically defining the relationships and/or interactions between the process equipment and the process parameters and/or without specifically defining how process parameters are computed or used to control the system. The data and information indicative of the relationships between and/or operation of the equipment and process parameters is process-specific and not included within the generic process system library. As used herein, the terms "process parameter" and "process signal" are used interchangeably.

A "generic library definition" as used herein refers to a subset of generic data and information corresponding to a portion of a generic process system library. In some examples, a generic library definition corresponds to a particular piece of equipment or control signal within a larger process system. In some examples, a generic library definition contains a hierarchy of data corresponding to a hierarchal relationship of equipment and/or process signals. Thus, a generic library definition may be referred to as a generic process system library. However, a generic library definition is primarily referred to as a subset or portion of a generic process system library to suggest that a generic process system library may be composed of multiple generic library definitions.

In some examples, a generic process system library includes generic process graphics data. Typically, a process graphic serves to represent process equipment and the values of process parameters associated with the equipment without regard to whether control is performed within the process system (e.g., the process parameters are generated internally) or in another system (e.g., device) and the resulting data is brought into the control system for viewing and operation (e.g., the process parameters are generated externally). Furthermore, process graphics are typically generated independent of whether the equipment is configured using conventional input/output (I/O), Fieldbus, Profibus, Futurebus, manual entry, and/or any other mechanism. Thus, at a high level, process graphics may generically represent any number of process control systems. However, in many known process control systems, process graphics only become useful when they are tied to a particular configuration of actual equipment operating according to a particular control strategy. Therefore, although many known process graphics for similar process control systems may look similar as a visual matter, the underlying configuration is typically process-specific. Further, in many examples, not only are the elements of a process graphic tied to a particular control strategy, the process graphic may include labels or other indicia for the process equipment and/or process signals such that the visual appearance of each process graphic is unique to the particular process system the graphic represents. Examples disclosed herein take advantage of the generic aspects of process graphics by incorporating generic process graphics into a generic process system library that can be reused to graphically represent multiple process control systems with a relatively small amount of process-specific configuration. In particular, the generic process system library includes the process graphics while abstracting out the details of how the process parameters and/or signals are displayed within the graphics are computed or used to control the process system.

Additionally or alternatively, in some examples, the generic process system libraries described herein include generic control strategy data. Typically, control strategies define desired interactions between process equipment and process parameters and/or signals associated with the equipment. In some examples, where the process control system is a safety instrumented system, the generic control strategy data includes safety instrumented functions that have been abstracted out to become generic (e.g., applicable to multiple comparable safety instrumented systems. As with process graphics, in many known process control systems, process control strategies are created for a specific process system being implemented for a specific project (e.g., based on unique device tags). Thus, the generic process system libraries described herein provide a means for identifying potential process parameters associated with the equipment in the process control system while abstracting out the details of how the process parameters are computed or used. That is, rather than linking specific process parameters from specific field devices to specific control modules, some example generic process system libraries described herein only express the possibility of such relationships by identifying the existence of such process parameters while leaving the specific interactions to be defined later when a specific process control system is configured. For example, a process control system may involve the measurement of a mass flow rate of fluid, which is based on the pressure, the temperature, and the density of the fluid. In some examples, each of these parameters may be measured using three separate devices to then calculate the mass flow rate, where each device directly measures one of the parameters. In contrast, in other examples, a single device (e.g., a coriolis flow meter) may directly measure the mass flow rate. The mass flow rate parameter is used in the control system for each of the foregoing examples but the way in which the value is determined is different. Accordingly, in some examples, a generic process system library identifies the mass flow rate process parameter (which is relevant to the control strategy) but in a generic form to exclude the particular device(s) providing the parameter (which is not relevant to the control strategy). In this manner, the generic process system library is applicable to either of the example settings.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator and/or engineer to review and/or operate one or more operator display screens and/or applications that enable the operator and/or engineer to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100. An example manner of implementing the example operator station 104 of FIG. 1 is described below in connection with FIG. 2.

The example operator station 104 includes and/or implements a process control application to allow process control system operators and/or engineers to configure process control systems or components thereof based on generic process system libraries and/or other generic library definitions as described more fully below. The example workstation 106 of FIG. 1 may be configured as an application station to perform one or more information technology applications, user-interactive applications and/or communication applications. For example, the workstation 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 114 via a data bus 116 and an input/output (I/O) gateway 118. The smart field devices 110, 112, 114 may be Fieldbus compliant valves, actuators, sensors, etc., in which case the smart field devices 110, 112, 114 communicate via the data bus 116 using the well-known Foundation Fieldbus protocol. Of course, other types of smart field devices and communication protocols could be used instead. For example, the smart field devices 110, 112, 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, 114, one or more non-smart field devices 120, 122 may be communicatively coupled to the example controller 102. The example non-smart field devices 120, 122 of FIG. 1 may be, for example, conventional 4-20 milliamp (mA) or 0-24 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to configure process control systems described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

Figure 2:
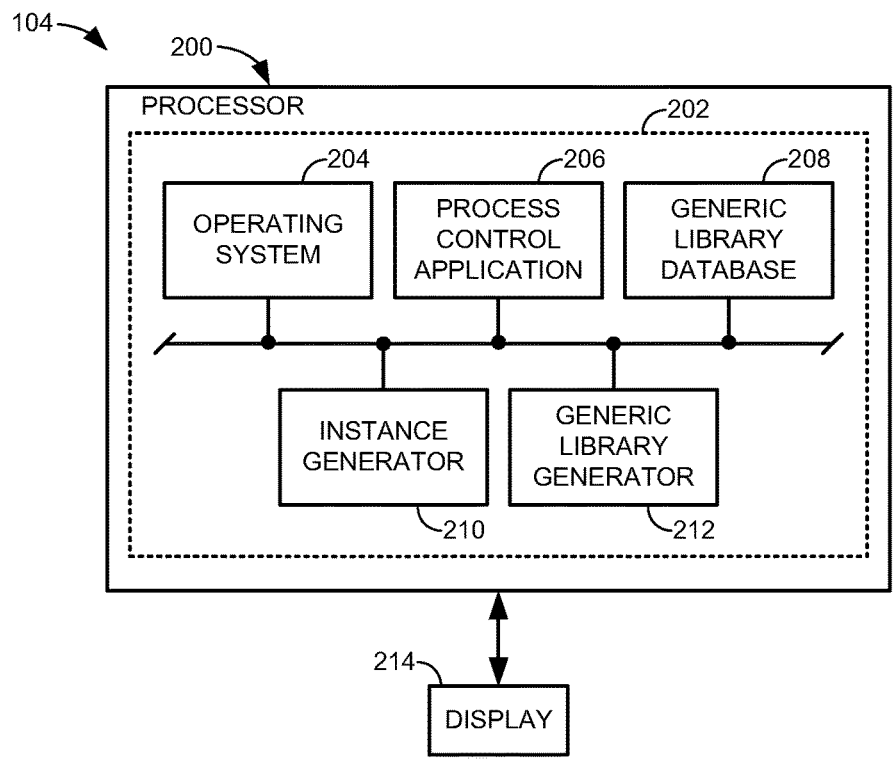
FIG. 2 illustrates an example manner of implementing the example operator station of FIG. 1 in accordance with the teachings disclosed herein.

FIG. 2 illustrates an example manner of implementing the example operator station 104 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, a process control application 206, a generic library database 208, an instance generator 210, and an generic library generator 212. An example operating system 204 is an operating system from Microsoft®. The example main memory 202 of FIG. 2 may be implemented by and/or within the processor 200 and/or may be one or more memories and/or memory devices operatively coupled to the processor 200.

To allow an operator and/or engineer to interact with the example processor 200, the example operator station 104 of FIG. 2 includes any type of display 214. Example displays 214 include, but are not limited to, a computer monitor, a computer screen, a television, a mobile device (e.g., a smart phone, a Blackberry™ and/or an iPhone™), etc. capable to display user interfaces and/or applications implemented by the processor 200 and/or, more generally, the example operator station 104.

The example operating system 204 of FIG. 2 displays and/or facilitates the display of one or more user interfaces for the process control application 206 by and/or at the example display 214. The example process control application 206 enables operator, engineer, and/or other personnel to have a high-level overview of a process control system (e.g., the process control system 100 of FIG. 1) and/or to control, configure, diagnose, or otherwise interact with and/or acquire data regarding the processes and corresponding equipment within the process control system 100. More specifically, in some examples, the process control application 206 may render a process graphic, via the display 214, representative of the equipment of a process control system (e.g., the process control system 100 of FIG. 1) or component thereof. In some examples, the process graphic(s) are generated and configured via the process control application 206 based on generic process graphics stored in the generic library database 208. Further, in some examples, the process control application 206 controls and/or operates the process control system 100 based on a control strategy that includes control routines and/or modules that define relationships between process measurements and/or signals and the associated equipment of the process control system 100 to perform the desired functions and/or activities defined by the control strategy. In some examples, the control strategy is generated and configured via the process control application 206 based on generic control strategies stored in the generic library database 208.

The example instance generator 210 generates instances of generic process system libraries and/or other library definitions taken from the generic library database for use or subsequent configuration by the process control application 206. In some examples, as described more fully below, the instance generator 210 generates an instance of a generic process system library by retrieving the appropriate generic process system library from the generic library database 208 and identifies the generic information within the generic process system library that needs process-specific and/or project-specific information to configure a particular process control system. In some examples, the generic information to be specified for a particular instance of a generic process system library is identified via generic placeholders within the generic process system library. In some examples, the instance generator 210 collects and provides the generic placeholders to a user in a single simplified group format to enable the user to quickly and easily assign values to each generic placeholder (e.g., via a script or a spreadsheet).

The example generic library generator 212 generates generic process system libraries based on specific process control systems that have been previously configured. In some examples, the generic library generator 212 identifies or facilitates a user in identifying the process specific information to be abstracted out of the system and assigned generic placeholders for subsequent configuration when an instance of the generic process system library is to be generated. In some examples, the instance generator 210 and the generic library generator 212 work in tandem to modify or adjust a generic process system library and/or an instance of a generic process system library.

While an example manner of implementing the operator station 104 of FIG. 1 is illustrated in FIG. 2, one or more of the elements, processes and/or devices illustrated in FIG. 2 may be combined, divided, re-arranged, omitted, eliminated and/or implemented in any other way. Further, the example processor 200, the example memory 202, the example operating system 204, the example process control application 206, the example generic library database 208, the example instance generator 210, the example generic library generator 212, and/or, more generally, the example operator station 104 of FIG. 1 may be implemented by hardware, software, firmware and/or any combination of hardware, software and/or firmware. Thus, for example, any of the example processor 200, the example memory 202, the example operating system 204, the example process control application 206, the example generic library database 208, the example instance generator 210, the example generic library generator 212, and/or, more generally, the example operator station 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 200, the example memory 202, the example operating system 204, the example process control application 206, the example generic library database 208, the example instance generator 210, and/or the example generic library generator 212 is/are hereby expressly defined to include a tangible computer readable storage device or storage disk such as a memory, a digital versatile disk (DVD), a compact disk (CD), a Blu-ray disk, etc. storing the software and/or firmware. Further still, the example operator station 104 of FIG. 1 may include one or more elements, processes and/or devices in addition to, or instead of, those illustrated in FIG. 2, and/or may include more than one of any or all of the illustrated elements, processes and devices.

Many process control systems are configured or defined by dividing the control system into various components and subcomponents at various levels of granularity. For example, a process plant may contain one or more process sites each of which may contain one or more process areas. Further, a process area may contain one or more process units that each contains one or more equipment modules each of which may contain one or more control modules. Typically, to assist operators, engineers, and/or other plant personnel in monitoring and/or controlling a process system, the different components or segments of the process control system are represented graphically through a piping and instrumentation diagram (P&ID) or other similar process graphic. Frequently, such process graphics are based on the physical equipment associated with the particular process component (e.g., area, unit, cell, etc.) of the process control system being displayed.

Figure 3:
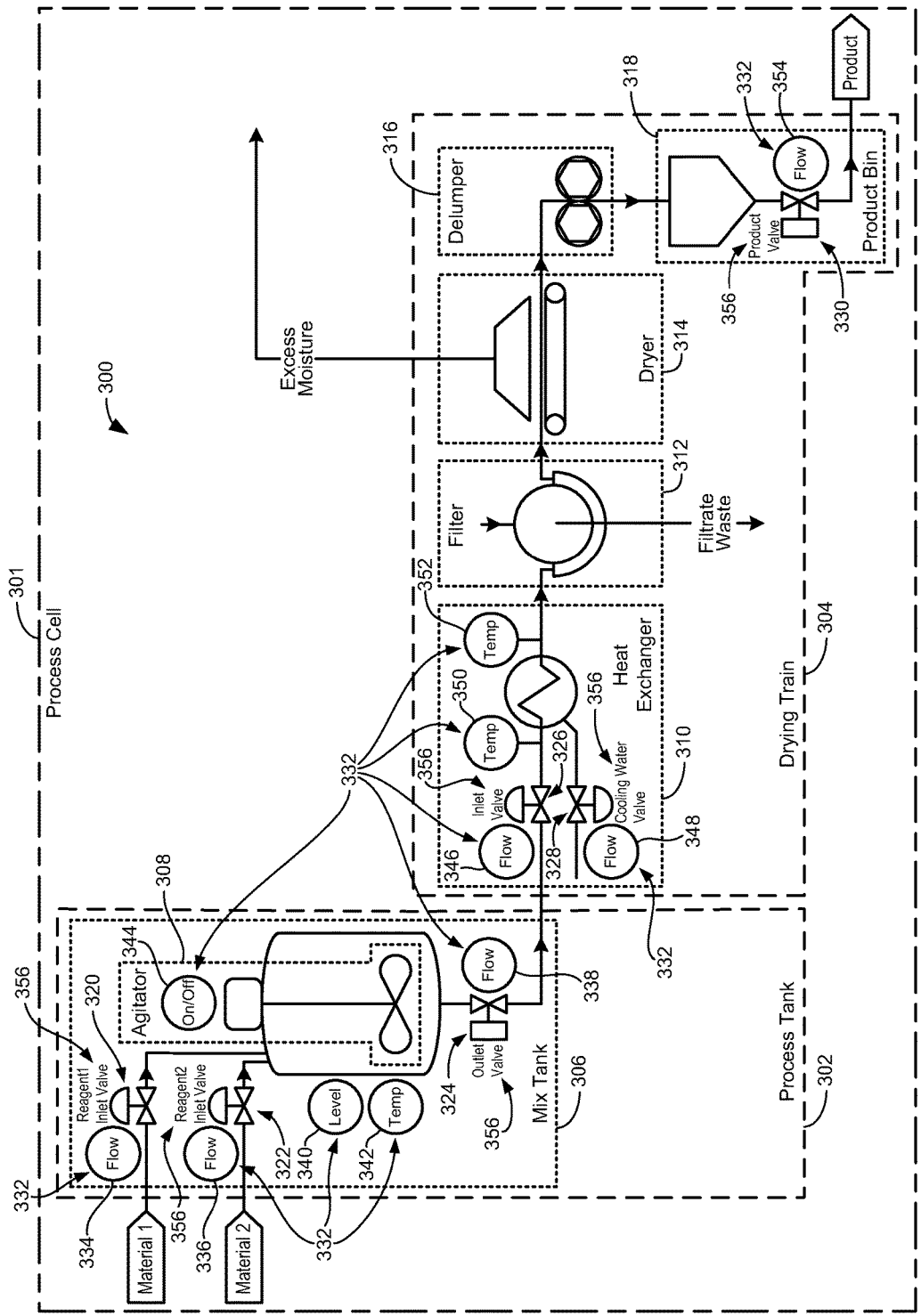
FIG. 3 illustrates an example process graphic representative of equipment in a process cell of an example process control system such as the example process control system of FIG. 1.

FIG. 3 is an example process graphic 300 having graphical elements representative of equipment associated with an example process cell 301 that may be part of a larger overall process control system (e.g., the process control system 100 of FIG. 1). As shown in the illustrated example, separate pieces of equipment are grouped or demarcated by dashed lines into various subcomponents (e.g., units, equipment modules, and control modules) of a process cell 301. In particular, the example process cell 301 shown in FIG. 3 includes a Process Tank unit 302 and a Drying Train unit 304. In the illustrated example, the Process Tank unit 302 includes a Mix Tank equipment module 306, which in turn includes an Agitator equipment module 308. The Drying Train unit 304 of the illustrated example includes a number of equipment modules including a Heat Exchanger equipment module 310, a Filter equipment module 312, a Dryer equipment module 314, a Delumper equipment module 316, and a Product Bin equipment module 318. Additionally, as represented in the process graphic 300 of FIG. 3, the example process cell 301 includes specific field devices including first and second reagent inlet valves 320, 322 and an outlet valve 324 within the Mix Tank equipment module 306; an inlet valve 326 and a cooling water valve 328 in the Heat Exchanger equipment module 310; and a product valve 330 within the Product Bin equipment module 318. In some examples, each of the first and second reagent inlet valves 320, 322, the outlet valve 324, the inlet valve 326, the cooling water valve 328, and the product valve 330 is associated with a specific control module that defines how the corresponding valve is operated and/or controlled. Additionally or alternatively, other items of equipment and/or groups of equipment may be associated with other control modules as well. In the illustrated example, the control modules are not specifically demarcated with dashed lines because the control modules correspond to particular devices or pieces of equipment (e.g., the valves 320, 322, 324, 326, 328, 330) and, therefore, are inferentially represented in the process graphic 300.

Beyond the physical equipment and the corresponding graphical representation of the physical equipment, some of the process equipment of the example process cell 301 are associated with process signals or measurements that are used to monitor and/or control the process cell (e.g., as used in the corresponding control modules). For purposes of explanation, in the example process graphic 300 of the process cell 301 of FIG. 3, such process signals are represented by circular icons 332. More particularly, the first and second reagent inlet valves 320, 322 are associated with corresponding first and second flow process signals 334, 336. Similarly, the outlet valve 324 is associated with a corresponding flow process signal 338. Additionally, as shown in the illustrated example of FIG. 3, the Mix Tank equipment module 306 is associated with a tank level process signal 340 and a temperature process signal 342 while the Agitator module 308 includes a corresponding on/off indication process signal 344. Within the Drying Train unit 304 of the illustrated example, the Heat Exchanger module 310 includes flow process signals 346, 348 corresponding to the inlet valve 326 and cooling water valve 328 and input and output temperature process signals 350, 352. Further, the product valve 330 is associated with another flow process signal 354.

Additionally, as shown in the illustrated example, the field devices (e.g., the valves 320, 322, 324, 326, 328, 330) are identified with descriptive labels 356. In some examples, the descriptive labels 356 are logical or intuitive descriptors of the equipment that may be generically applied to any process cell that is similarly configured. In this manner, the process graphic 300 as shown and described is reusable for multiple process control systems and/or components thereof. That is, if a process control system included multiple process cells that use two materials to produce a product as represented in the process graphic 300, unlike other known process graphics that are based on unique device tag names specific to each of the multiple process cells, the process graphic 300 could be used to represent each of the multiple process cells. Similarly, if separate process control systems each include a comparable process cell that produces a product from two input materials as shown in FIG. 3, the example process graphic 300 may apply equally to each such process control system. In other words, each piece of equipment or field device within the process cell 301 of the illustrated example is represented by corresponding generic graphical elements within the process graphic 300 and identified by a generic or descriptive label 356 rather than a process-specific device tag name.

Figure 4:
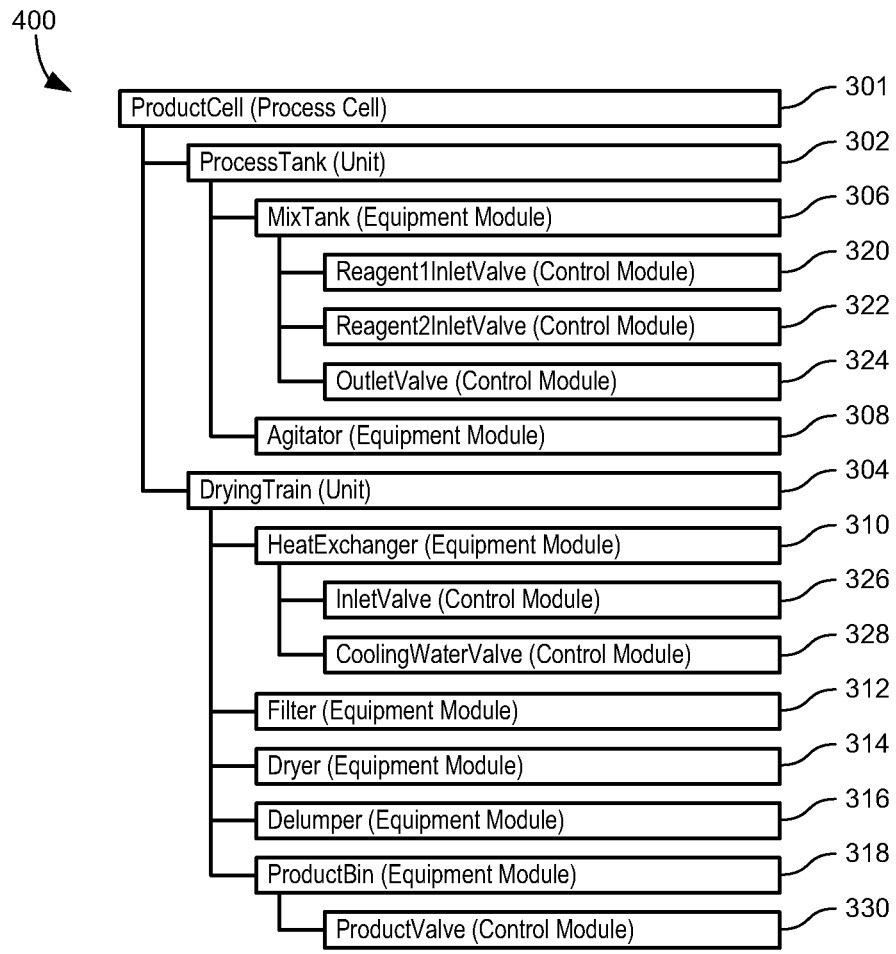
FIG. 4 illustrates an example equipment hierarchy based on the equipment in the example process cell of FIG. 3.

In some examples, the process equipment represented in the process graphic 300 of FIG. 3 and relationships of the different items of process equipment can be expressed or organized in an equipment hierarchy or tree such as the example equipment hierarchy 400 shown in FIG. 4. The equipment hierarchy 400 illustrated in FIG. 4 is representative of a hierarchical library of information corresponding to the equipment in the process control system. That is, the equipment hierarchy 400 is more than a nested stacking of labels of equipment but is representative of different logical containers or data structures comprising information associated with the corresponding equipment (e.g., process graphics, associated process parameters, control strategies, tag names, descriptive labels, etc.). As shown in the illustrated example of FIG. 4, at the top level of the equipment hierarchy 400 is the process cell 301. The Process Tank unit 302 and the Drying Train unit 304 are at the next level down (unit level) followed by the Mix Tank module 306, the Agitator module 308, the Heat Exchanger module 310, the Filter module 312, the Dryer module 314, the Delumper module 316, and the Product Bin module 318 at the equipment module level of the equipment hierarchy 400. Finally, as shown in the illustrated example, the first and second reagent inlet valves 320, 322, the outlet valve 324, the inlet valve 326, the cooling water valve 328, and the product valve 330 are at the lowest level of the equipment hierarchy 400. Other example equipment hierarchies may have more or fewer levels than shown in the example equipment hierarchy 400 depending on the nature, characteristics, and/or complexity of the component of the process control system the equipment hierarchy is intended to represent.

Figure 5:
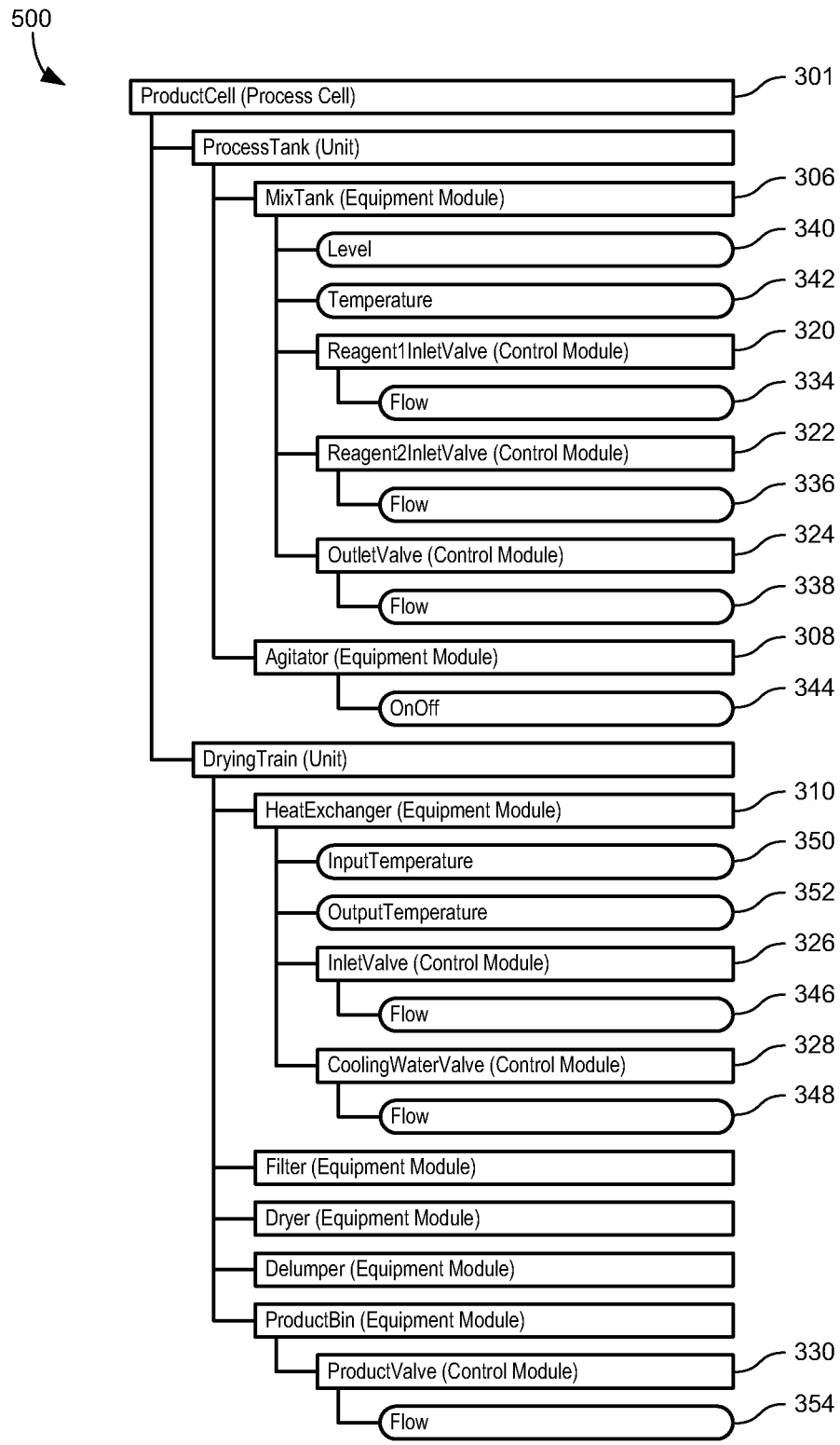
FIG. 5 illustrates an example generic process system library corresponding to the example process cell of FIG. 3.

In some examples, each of the process signals 334, 336, 338, 340, 342, 344, 346, 348, 350, 352, 354 used in the control strategy along with corresponding information is superimposed or incorporated into the equipment hierarchy 400 of FIG. 4 to produce a generic process system library 500 as illustrated in FIG. 5. As with the equipment hierarchy 400, the example generic process system library 500 illustrated in FIG. 5 is representative of a hierarchical library of information associated with the equipment and process signals in the example process cell 301. The process signals are distinguished from process equipment in the generic process system library 500 by rounded boxes as shown in the illustrated example. More particularly, as shown in the illustrated example of FIG. 5, each of the process signal 334, 336, 338, 340, 342, 344, 346, 348, 350, 352, 354 associated with the example process cell 301 are placed within the hierarchy 400 under the corresponding equipment components (e.g., equipment modules or control modules) with which the process signals 334, 336, 338, 340, 342, 344, 346, 348, 350, 352, 354 are associated. That is, the tank level process signal 340 and the temperature process signal 342 are placed immediately under the Mix Tank module 306 while the various flow process signals 334, 336, 338, 346, 348, 354 are placed under their corresponding or respective valves 320, 322, 324, 326, 328, 330. Further, as shown in the example generic process system library 500, the on/off indication process signal 344 is placed under the corresponding Agitator module 308. Further, the input and output temperature process signals 350, 352 are placed under the Heat Exchanger module 310.

The illustrated example of FIG. 5 is referred to as a generic process system library because the process-specific and/or project-specific details associated with the process equipment and/or process signals have been abstracted out. That is, the generic process system library 500 contains generic information that is applicable to multiple process control systems that are similar in nature (e.g., comparable process equipment layout, organization, and/or control). As a result, the example generic process system library 500 may be used to configure multiple process control systems. In other words, the example generic process system library 500 includes reusable information appropriately organized based on a common equipment hierarchy to provide a framework or template on which a specific process and/or project may be configured without requiring an engineer to repeatedly recreate the process graphics, control strategies, and/or tag names for the equipment and corresponding control signals to configure the process control system.

For example, each item listed in the example generic process system library 500 represented in a rectangular box (e.g., corresponding to the items in the equipment hierarchy 400) corresponds to one or more graphical elements shown in the process graphic 300. As described above, the graphical elements of the of the process graphic 300 as well as the descriptive labels 356 identifying the devices represented in the process graphic 300 are generic such that the process graphic 300 is reusable between multiple process systems and/or projects. As shown in the illustrated example, each of the rectangular boxed items in the generic process system library 500 associated with particular items of equipment in the process cell 301 is also associated with particular graphical elements within the process graphic 300 of the process cell 301. In some examples, the higher level items (e.g., items that include or are at a higher level than other items in the equipment hierarchy 400) include a single image or graphic (e.g., a single JPEG, GIF, etc.) that represents the corresponding item and all other items at lower levels of the hierarchy. Accordingly, in some examples, the entire process graphic 300 corresponds to a single image or graphic (e.g., a single JPEG, GIF, etc.) stored with the data associated with the top level item (e.g., the product cell 301) of the example generic process system library 500 of FIG. 5. Additionally or alternatively, in some examples, the process graphic 300 is a combination of multiple images or graphics each of which is associated with a separate item in the example generic process system library 500. For instance, in some examples, the process graphic 300 is composed of a first image or graphic corresponding to the Process Tank unit 302 and a second image corresponding to the Drying Train unit 304. In other examples, the process graphic 300 is composed of separate images corresponding to lower levels of equipment in the equipment hierarchy 400 (e.g., the separate equipment modules and/or the graphical elements representing the individual devices in the process control system).

Additionally, in some examples, the example generic process system library 500 includes items corresponding to the process signals 334, 336, 338, 340, 342, 344, 346, 348, 350, 352, 354 (e.g., the items represented by rounded boxes). However, unlike a fully configured process control system that is project specific and includes a fully detailed control strategy that defines how the process signals are computed and/or used to control the process equipment, the round boxed items listed in the generic process system library 500 are associated with information that serves to merely express the possibility of such control information. For example, regardless of the particular process, project, and/or control strategy, for each valve 320, 322, 324, 326, 328, 330 there is a corresponding flow that can be measured or monitored and/or controlled. Accordingly, in some examples, each of the round boxed items in the generic process system library 500 includes information that identifies the existence of a flow signal associated with each valve 320, 322, 324, 326, 328, 330 without including information defining the details of how (or whether) the flow signal is computed and/or used in the process cell 301. Such project-specific information (e.g., defining the relationships between the process signals and the process equipment) can be defined later when a particular instance of the generic process system library 500 is instantiated to configure a specific process, as described more fully below, but the underlying framework for such a process control system is already contained within the example generic process system library 500.

Further, in some examples, as described above, the process signals 334, 336, 338, 340, 342, 344, 346, 348, 350, 352, 354 are represented graphically by the generic circular icons 332. As shown in the process graphic 300 of FIG. 3, the icons 332 contain generic labels corresponding to the type of process signal each icon 332 represents. Accordingly, in some examples, in addition to associating generic information corresponding to computation and/or use of the process signals 334, 336, 338, 340, 342, 344, 346, 348, 350, 352, 354 with the rounded items of the generic process system library 500 to enable the subsequent configuration of a specific control strategy, the generic process system library 500 includes generic graphical elements to represent the process signals 334, 336, 338, 340, 342, 344, 346, 348, 350, 352, 354 with a corresponding process graphic. In this manner, the graphical representation of the process signals 334, 336, 338, 340, 342, 344, 346, 348, 350, 352, 354 may be tied to the associated control strategy, thereby enabling the complete configuration of a particular process control system. Stated more generally, in some examples, the generic elements of a process graphic are associated with the generic elements of a control strategy to establish a complete framework upon which multiple process control systems may be configured with relatively little effort and/or redundant effort on the part of configuration engineers or other personnel. In some examples, the circular icons 332 are included within the image(s) or graphic(s) described above. In other examples, the circular icons 332 are separate images or graphics to be displayed along with the process graphics described above.

The generic process system library 500 includes all the basic elements in an appropriate hierarchical relationship to construct any suitable process graphic and/or any suitable control strategy by referencing the appropriate process equipment and process signals. In particular, as shown in FIG. 500, the generic process system library 500 is arranged as a hierarchal library of items representative of information and/or data corresponding to the respective process equipment and/or process signals. The stacking or nested nature of the items in the hierarchy enables relative addressing to access process data for use in a process graphic and/or a control strategy. For instance, in some examples as noted above, the process graphic 300 may be a single graphic or image to represent the entire process cell 301. In such examples, process data associated with the individual process signals within the process cell 301 may be accessed for display within the process graphic 300 by defining the path within the generic process system library 500 to the item of interest (e.g., a particular process signal) from the process cell 301. For example, if an engineer desires to display data associated with the output temperature process signal 352 within the process graphic 300, the process graphic 300 is linked to the output temperature process signal 352 based on the following path: ProcessCell/DryingTrain/HeatExchanger/OutputTemperature. In some examples, each of the process signals 334, 336, 338, 340, 342, 344, 346, 348, 350, 352, 354 includes a number of available fields for reference such as the process variable value and one or more alarm values. Further, if the process signal is to be used for controlling the process system, the process signal may also include a field for a set point value for the process variable. Accordingly, to access a particular field of a particular process signal (e.g., to be rendered within a process graphic or otherwise used), an engineer adds the particular field to the end of the relative path described above (e.g., ProcessCell/DryingTrain/HeatExchanger/OutputTemperature/PV).

Additionally or alternatively, as described above, subcomponents of the process graphic 300 may be represented by separate individual graphics or images. Accordingly, in some examples, process data associated with a process signal within a particular sub-component of the generic process system library 500 may be accessed based on relative addressing within the particular sub-component. For example, if the Mix tank equipment module is represented by a graphic specific to the Mix tank, the process variable value of the tank level process signal 340 may be accessed based on the following Mix Tank relative addressing path: MixTank/Level/PV.

In addition to linking data for purposes of process graphics, in some examples, relative addressing within the generic process system library 500 for the process cell 301 and/or a particular sub-component is used to access process data to construct and/or implement control strategies for a particular process control system. Accordingly, the generic process system library 500 described herein provides a framework in which process graphics and control strategies can be developed independently of each other and independent of the configuration of actual data sources in a specific control system because the process equipment and process signals are represented generically for purposes of both graphical representation and logical control. An additional advantage of the example generic process system library 500 is that the information contained therein is made generic based on descriptive or logical labels for the process equipment and process signals. The descriptive nature of the items within the generic process system library 500 is consistent with how process engineers and operators view and/or think about a process control system. That is, while configuration engineers, instrument engineers, and/or maintenance technicians typically view process information based on tags associated with particular devices, process engineers and operators typically view process information based on what the devices are and/or what they do.

In some examples, device tag names are also incorporated into the generic process system library 500. Tag names are specific to each device and typically specific to a particular project. Accordingly, in some examples, the tag names used in the generic process system library 500 are rendered generic by assigning each process equipment and process signal a generic tag name using a tag-based convention that includes placeholders within common sections of the tag names that are process and/or project specific. For example, the composition of the tag names for each device in a process control system is typically standardized by some convention such as, for example, the International Society of Automation (ISA). The ISA tagging convention uses specific combinations of letters to identify the purpose or function of process equipment rather than identifying the particular devices used to implement the equipment. Accordingly, to uniquely identify individual devices within a process control system, configuration engineers typically precede and/or follow the ISA defined letters with additional letters and/or numbers to define a full, unique tag name. In many known control systems, the letters and or numbers added to the ISA letters correspond to particular portions or components of a process control system. For example, all devices within a particular area of a process plant may have a tag name with the ISA letters preceded by the same alphanumeric string to indicate that all the devices belong within the particular area associated with the alphanumeric string (e.g., all such devices begin with the prefix "18F" corresponding to area 18F). Further, in some examples, a subset of the devices within the particular area (e.g., 18F) corresponding to a particular loop of the area may have a tag name with the ISA letters followed by a common series of numbers (e.g., all such devices end with a 300 series number (e.g., 301, 302, 303, 304, etc.)). In some examples, the tag names for the devices in a process control system are associated with the corresponding items in the generic process system library 500 except that the common sections of the tag names have been abstracted out as shown and described in connection with FIG. 6 such that the tag names are generic (e.g., not specific to a particular, configured process system).

Figure 6:
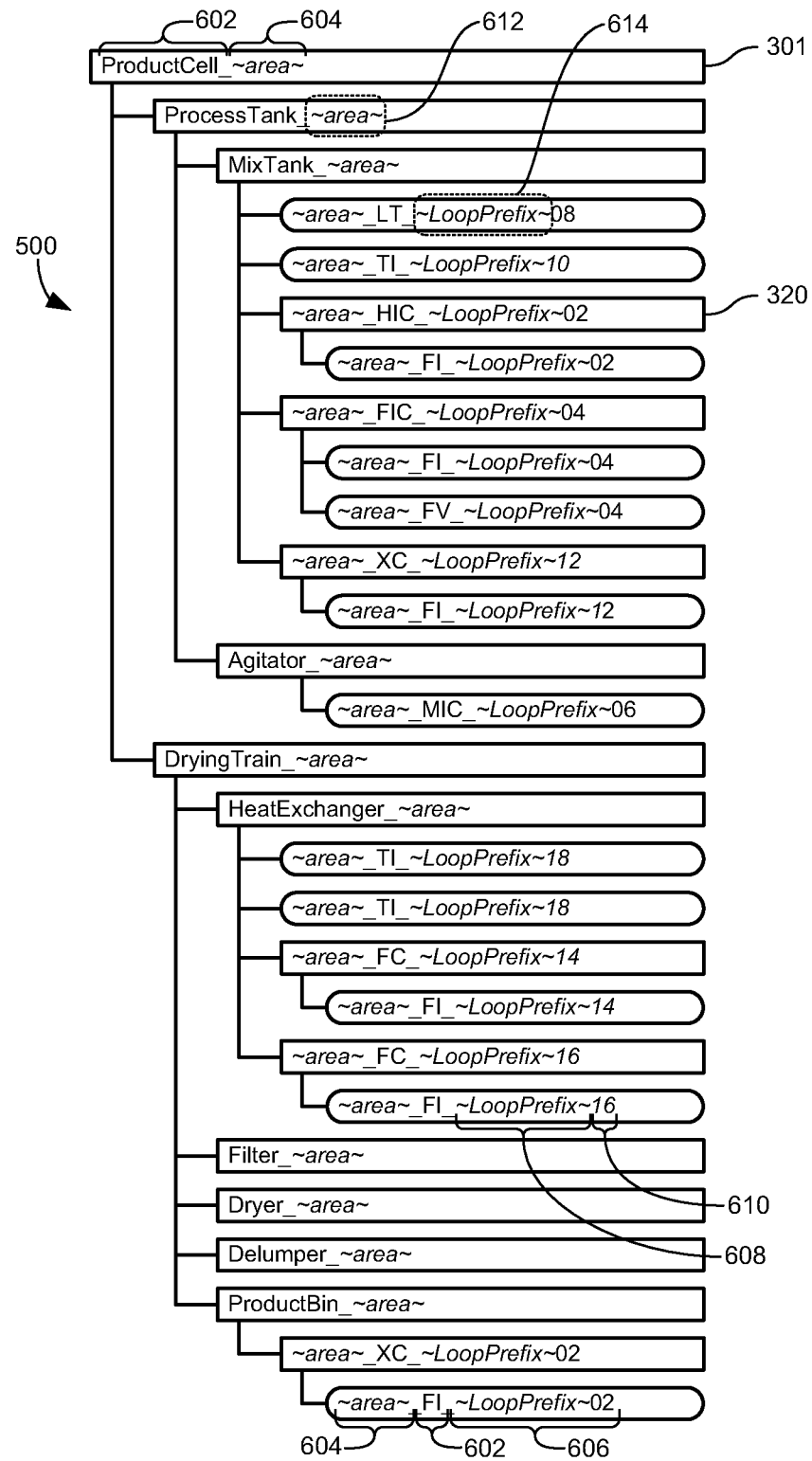
FIG. 6 illustrates the example generic process system library of FIG. 5.

FIG. 6 illustrates the generic process system library 500 with each item identified by a generic tag name rather than the descriptive labels shown in FIG. 5. As described above, the generic process system library 500 contains information organized in a hierarchy of the equipment of the process cell 301 and corresponding process signals. Thus, although the tag names shown in FIG. 6 are different than descriptive labels shown in FIG. 5, each item within the example generic process system library 500 contains both tag name information and descriptive label information such that FIGS. 5 and 6 are different representations of the same thing. In the illustrated example, the tag names for the upper level items in the generic process system library (e.g., the process cell 301, the process units 302, 304, and the process equipment modules 306, 308, 316, 318) include a naming section 602 and an area identifier section 604. In addition to the naming section 602 and the area identifier section 604 of the tag names, the tags for the lower level equipment and the process signals of the generic process system library 500 (e.g., the valves 320, 322, 324, 326, 328, 330 and the process signals 334, 336, 338, 340, 342, 344, 346, 348, 350, 352, 354) shown in FIG. 6 also include a loop identifier section 606. In the illustrated example, the naming section 602 of each of the upper level items corresponds to the descriptive label for the respective item in the generic process system library 500 shown in FIG. 5 while the naming section 602 of the lower level items corresponds to the ISA tagging convention for the respective process equipment or process signal. In some examples, the loop identifier section 606 of the tag names for the lower level items includes a loop prefix section 608 and a loop suffix section 610. In the illustrated example, the loop identifier section 606 of the tag names identifies the particular loop with which the corresponding process equipment and/or process signal is associated. In some examples, the loop prefix section 608 generically identified the loop while the loop suffix section 610 identifies the specific control module (and corresponding process signals) within the loop.

As shown in the illustrated example, the area identifier section 604 of each of the tag names in the generic process system library 500 contains a generic placeholder 612 designated as "~area~." Similarly, the loop prefix section 608 of the tag names shown in FIG. 6 contain another generic placeholder 614 designated as "~LoopPrefix~." In some examples, the generic placeholders 612, 614 enable the tag names to be generically defined for use or reuse across multiple process control systems with significantly less time and effort because configuring an instance of the generic process system library 500 for a particular process control system involves assigning particular values to the generic placeholders 612, 614. That is, while the naming section 602 and/or the loop suffix section 610 of the loop identifier section 606 of the tag names uniquely distinguish each item in the generic process system library 500 from every other item, the generic placeholders 612, 614 enable the generic process system library 500 to be configured for multiple different loops and/or multiple areas within the same process control system or multiple different process control systems depending upon the values assigned to the placeholders 612, 614 when configuring a particular process control system. Other tag names using different naming conventions and/or different generic placeholders in place of the same or different information may alternatively by implemented in accordance with the teachings disclosed herein. For example, additional placeholders may be used for a unit number or a room number in the tag name or any other identifier based on the configuration and/or layout of the process control system and the particular equipment being represented by a generic process system library.

Figure 7:
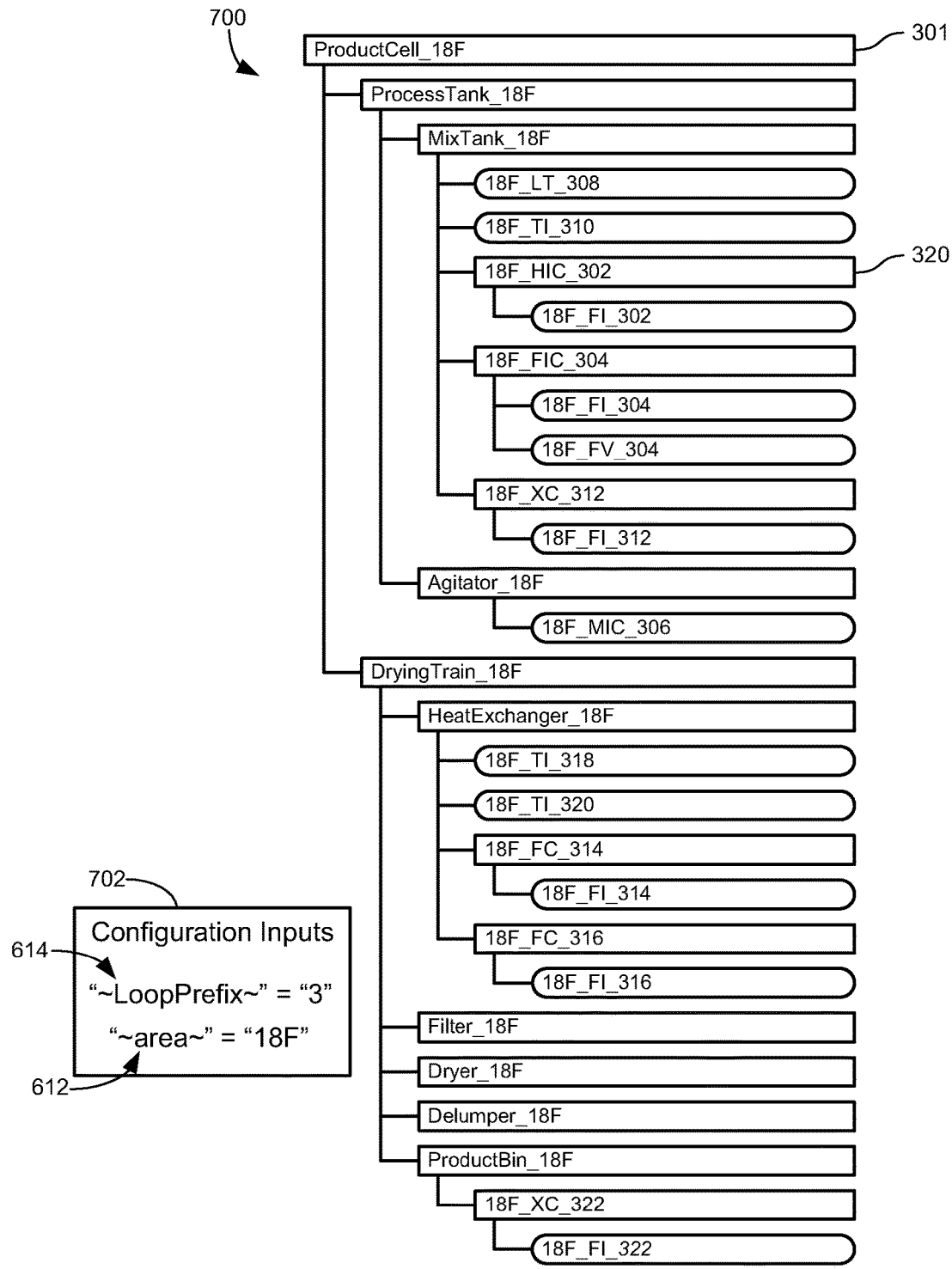
FIG. 7 illustrates an example instance of the example generic process system library of FIGS. 5 and/or 6.

For example, FIG. 7 illustrates an example instance 700 of the example generic process system library 500 of FIGS. 5 and 6 with each item identified by a particular tag name based on process-specific configuration inputs 702. As shown in the illustrated example, the configuration inputs 702 assign the generic area placeholder 612 the value of "18F" and assign the generic loop prefix placeholder 614 the value of "3" (e.g., the generic tag name ~area~_HIC_~LoopPrefix~02 corresponding to the first reagent inlet valve 320 becomes 18F_HIC_302). In this manner, based on only two user-defined inputs, a unique name for every piece of process equipment and every process signal to be used in a particular application for the instance 700 is configured. The completed tag names, as shown in the illustrated example of FIG. 7, correspond to tags that a configuration engineer may have individually assigned to each device when configuring a control system using known methods. However, in examples disclosed herein the tagging of all devices in the entire process cell 301 may be configured in a single step by creating an instance of the generic process system library 500 and providing the two configuration inputs 702 corresponding to each of the two generic placeholders 612, 614. Further, if a similar process cell is used in a separate location within the same process control system (e.g., in a different area and/or associated with a different loop), an engineer can reuse the generic process system library 500 and configure the similar process cell by creating a separate instance of the generic process system library 500 that assigns a different value to one or both of the placeholders 612, 614. Further still, the generic process system library 500 can be used to configure a completely separate control system that includes one or more process cells similar (e.g., a similar equipment hierarchy) to the process cell 301. Accordingly, the examples disclosed herein can significantly reduce the complexity, redundancy, and/or labor involved in configuring a process control system and/or configuring a second process control system that is similar to a previously configured control system.

In some examples, both the generic tag names shown in FIG. 6 and the descriptive labels shown in FIG. 5 are incorporated or included within the generic process system library 500. That is, each item listed in the generic process system library 500 is associated with the corresponding generic tag name in addition to the other information (e.g., process graphics and/or control strategies) described above. In some examples, the tag names for the process equipment and the process signals are the basis for the relative addressing described above. That is, because each generic tag name uniquely identifies the corresponding process equipment or process signal within the generic process system library 500 (based on the naming section 602 and the loop suffix section 610 of the loop identifier section 606), each generic tag name can define the path through the hierarchy to access any desired process data. In this manner, in addition to providing a descriptive naming convention for all process equipment and process signals, as typically used by process engineers and operators, in some examples, a tag-based naming convention is also supported to assist instrument engineers and maintenance technicians that typically rely on device tag names.

Additionally, the inclusion of tag names in the example generic process system library 500 enables the process data identified for use in the process graphics and/or the control strategies as described above to be bound to real data sources (i.e., the actual physical devices providing the data). In some examples, the data source for a process signal defined in the generic process system library 500 may be external to the process control system (e.g., based on a measurement from a field device). In such examples, the value of the process signal is mapped to the value of the corresponding external device when the process system is configured. In some such examples, the mapping is represented generically within the generic process system library 500 by another placeholder similar to the placeholders 612, 614 describe above such that when a specific instance of the generic process system library 500 is created to configure a particular process control system, a configuration engineer is prompted to input information to identify the path to the external device. In some examples, the data source for a process signal defined in the generic process system library 500 may be internal to the process control system (e.g., calculated based on previously acquired process parameter values). In such examples, the value of the process parameter can be directly mapped in the generic process system library 500 onto a control strategy based on the relative addressing described above.

Figure 8:
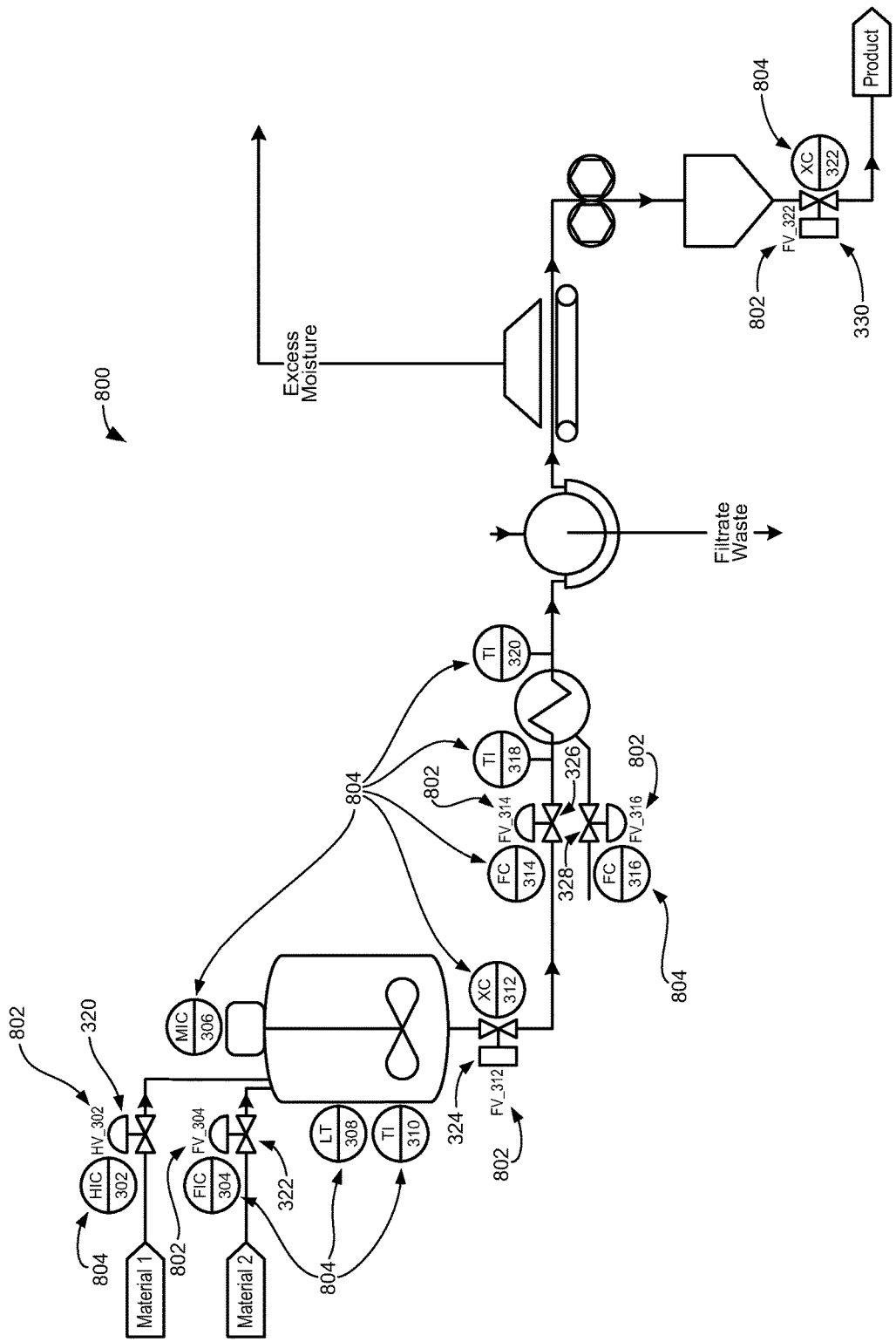
FIG. 8 illustrates the example process graphic of FIG. 3 with tag names corresponding to the instance of FIG. 7.

In some examples, the generic tag name information shown in the generic process system library 500 of FIG. 6 is used in connection with the process graphic 300. For example, the tag names may be associated with the corresponding process equipment and process signals represented in the process graphic. For example, FIG. 8 shows an example process graphic 800 that corresponds to the example process graphic 300 of FIG. 3 but contains tag information corresponding to the instance 700 of the generic process system library 500. Put another way, the process graphic 800 is an instance of the generic process graphic 300 of FIG. 3 of the generic process system library 500. In the example process graphic 800 of FIG. 8, the field devices (e.g., the valves 320, 322, 324, 326, 328, 330) are identified by device tag names 802 instead of the descriptive labels 356 as shown in the process graphic 300 of FIG. 3. Further, in some examples, the process graphic 800 includes device tag circular icons 804 with tag name information (e.g., the ISA letters and the loop number) instead of the generic circular icons 332 as shown in the process graphic 300 of FIG. 3. In some examples, the device tag names 802 and the device tag circular icons 804 are associated with the generic process system library 500 in addition to the descriptive labels 356 and the generic circular icons 332. In this manner, the process graphic of an instance of the generic process system library 500 can toggle between a descriptive or logical rendering of the process (e.g., similar to in the process graphic 300 of FIG. 3) and a tag-based rendering of the process (e.g., as shown in the process graphic 800 of FIG. 8) in accordance with the needs and/or desires of the particular user viewing the process graphic.

Although the generic process system library 500 described above can significantly decrease the time and expense of configuring a process control systems, in some examples, a specific process control system may not correspond identically to the generic information contained in the generic process system library 500. For example, while the physical equipment of a particular process control system may be substantially the same as represented in the process graphic 300 of FIG. 3, the particular process control system may have a different component and/or implement a slightly different control strategy that is not accounted for by generic placeholders within the generic process system library 500. Thus, in some cases, a generic process system library 500 may be used to configure a substantial portion of a particular process system, and after an instance of the generic process system library 500 is created, the instance may be modified to configure the remainder of the particular system. In some examples, the process graphics of the instance are modified. In some examples, the control strategy within the process graphic is modified. Additionally or alternatively, in some examples, the underlying process equipment that forms the equipment hierarchy is modified resulting in a corresponding modification to the control strategy and/or the process graphics. In some examples, engineers may modify an instance of the generic process system library 500 independent of the underlying generic process system library 500 using known configuration methods. In other examples, an instance of the generic process system library 500 is modified based on other generic library definitions associated with the change needed for the particular process control system in connection with the generic process system library 500 to then instantiate a new or modified instance of the generic process system library 500.

For example, in the instance 700 of the generic process system library 500 represented graphically by the process graphic 800 of FIG. 8, the first reagent valve 320 is manually controlled. That is, the ISA letters associated with the valve 320 are "HV" to define a hand operated valve and the ISA letters for the corresponding control signal are "HIC" to define a hand indicating controller. In contrast, the second reagent valve 322 in the illustrated example is incorporated into an automatic control loop. Accordingly, the ISA letters for the valve 322 are "FV" to specify that the valve 322 is a control valve and the ISA letters for the corresponding control signal are "FIC" to define a flow indicating controller used by the control valve. As shown in the generic process system library 500 of FIG. 6, the naming section 602 of each device tag, which includes the ISA letters for the lower level items, is predefined within the generic process system library 500. Accordingly, if the generic process system library 500 is used to configure a particular process control system that is similar to the process cell 301 described above, except that the first reagent valve 320 is incorporated into an automatic control loop, the tag name is correct for all devices except the first reagent valve 320. That is, although the presence of the valve 320 within the process and the relationship of the valve 320 to the surrounding equipment is unaffected by this variation in the particular process control system being configured, the tag name defined by the generic process system library 500 is no longer applicable. Accordingly, the generic process system library 500, which is based on equipment relationships as defined in the equipment hierarchy 400, may still be used to configure such a process control system. However, even though such a process control system could be represented graphically by the generic process graphic 300, the device tag name for the valve 320 would not be correct. Accordingly, in some examples, once an instance (e.g., the instance 700) of the generic process system library 500 is created for the particular process control system, the instance may be modified to adapt it to the particular circumstances of the process control system as described more fully in connection with FIG. 9.

Figure 9:
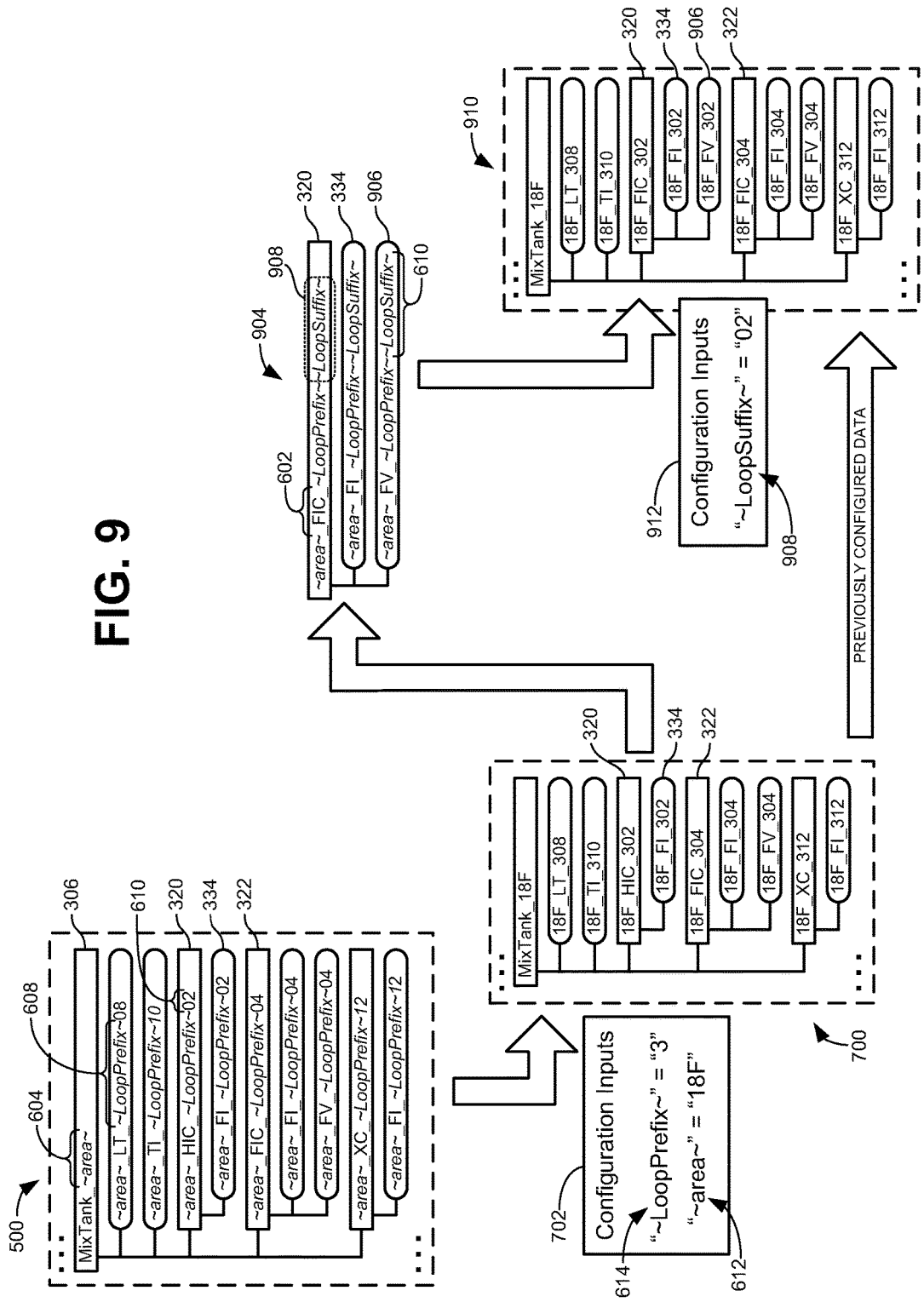
FIG. 9 illustrates the instance of FIG. 7 being generated and then modified in accordance with the teachings disclosed herein.

FIG. 9 shows the example generic process system library 500 of FIG. 6 (only a portion shown) with the items identified by generic tag names. In some examples, as described above, an engineer may provide configuration inputs 702 to define values for the generic placeholders 612, 614 when an instance of the generic process system library 500 is generated. In the illustrated example, the generic placeholder 612 corresponding to the area identifier section 604 of each tag name is assigned the value of "18F" and the generic placeholder 614 corresponding to the loop prefix section 608 of each tag name is assigned the value of "3." The result of such an example is the example instance 700 of FIG. 7 (only a portion of which is shown). As shown in the example generic process system library 500 and the instance 700 of the generic process system library 500, the valve 320 is identified with a device tag name corresponding to a manually controlled valve (e.g., HIC) with a corresponding flow indicating process signal (e.g., FI). Accordingly, before the instance 700 of the generic process system library 500 can be fully configured to implement the particular process control system where the valve 320 is automatically controlled, the instance 700 of the generic process system library 500 needs to be modified or updated.

In some examples, the generic process system library 500 is composed of generic library definitions of subsets of the information contained in the generic process system library 500. That is, while the generic process system library 500 may be viewed as a single hierarchical library of generic information, portions of the generic process system library 500 may additionally or alternatively be associated with corresponding independent hierarchical libraries of generic information and data. For example, each of the equipment modules 306, 308, 310, 312, 314, 316, 318 shown in FIG. 3 may have a corresponding generic library definition corresponding to the process equipment and process signals contained therein. Further, in some examples, the generic library definitions corresponding to each equipment module 306, 308, 310, 312, 314, 316, 318 are composed of lower level generic library definitions down to individual items in the hierarchy. Each of the generic library definitions for individual items and/or generic hierarchies of items used to define the generic process system library 500 are stored in the generic library database 208 (FIG. 2). In some examples, multiple library definitions and/or generic hierarchies may be stored corresponding to the same individual items and/or groups of items in the generic process system library 500. In some examples, the various generic library definitions may be used to modify an instance of the generic process system library.

For example, to update the instance 700 of the generic process system library 500, in the above example, to incorporate the first reagent valve 320 into a control loop, an engineer may select the valve 320 in the instance 700 of the generic process system library 500 (e.g., via a mouse click within the process control application 206) and select a command (e.g., via a context menu) to convert the generic information of the generic process system library 500 associated with the valve 320 (e.g., based on a hand controlled valve generic library definition) to a different library of generic information (e.g., based on a loop controlled valve). For example, as shown in FIG. 9, a flow loop generic library definition 904 may be selected for the valve 320 in place of the manually controlled information within the original generic process system library 500. In some examples, the flow loop generic library definition 904 contains generic device tag names that include the proper ISA letters (for a loop controlled valve) within the naming section 602 of the device tag. That is, instead of the ISA letters being "HIC" as shown in the portion of the generic process system library 500, the ISA letters for the valve 320 in the flow loop generic library definition 904 are "FIC." Further, as shown in FIG. 9, while the valve 320 is associated with a flow indicating process signal 334 (ISA letters "FI") in both the generic process system library 500 and the flow loop generic library definition 904, the flow loop generic library definition 904 includes an additional flow valve process signal 906 (ISA letters "FV"). Additionally, in the illustrated example, the flow loop generic library definition 904 is different than the corresponding generic information in the generic process system library 500 in that the loop suffix section 610 of the loop identifier section 606 of the device tag name contains a generic placeholder 908 (e.g., "~LoopSuffix~") in the flow loop generic library definition 904 for the loop identifier section 606 rather than a predefined unique value as in each of the device tag names in the generic process system library 500. In this manner, the flow loop generic library definition 904 can be reused for multiple valves in multiple process control systems and/or within the same process control system and/or within the same loop.

In some examples, once an engineer has selected the flow loop generic library definition 904 to replace the information associated with the hand controlled valve 320, an instance of the flow loop generic library definition 904 is generated along with the rest of the generic process system library 500 resulting in an updated or modified instance 910 of the generic process system library 500 that includes the proper device tag names for the first reagent valve 320 modified to be a control valve. In some examples, generating the modified instance 910 once the flow loop generic library definition 904 has been selected involves the engineer entering one or more configuration inputs 912 to assign a specific value to the generic loop suffix placeholder 908 based on the particular process control system being configured. For example, in FIG. 9 the configuration inputs 912 assign the generic loop suffix placeholder 908 the value of "02" to correspond to the loop suffix section 610 of the tag name associated with the first reagent valve 320 in the generic process system library 500. In some examples, the other generic placeholders 612, 614 are automatically assigned based on the values previously provided in the configuration inputs 702 when generating the original instance 700 of the generic process system library 500. Furthermore, in some examples, all other configurations and/or settings established before the modification that are still relevant are carried forward to the modified instance 910. For example, in both the original instance 700 and the modified instance 910, the valve 320 is associated with the flow indicating process signal 334 (e.g., 18F_FI_302). Accordingly, the process signal 334 retains any defined control strategies or other configurations associated with the process signal previously defined before the modification even though the valve 320, one level up in the hierarchy, was modified.

Figure 10:
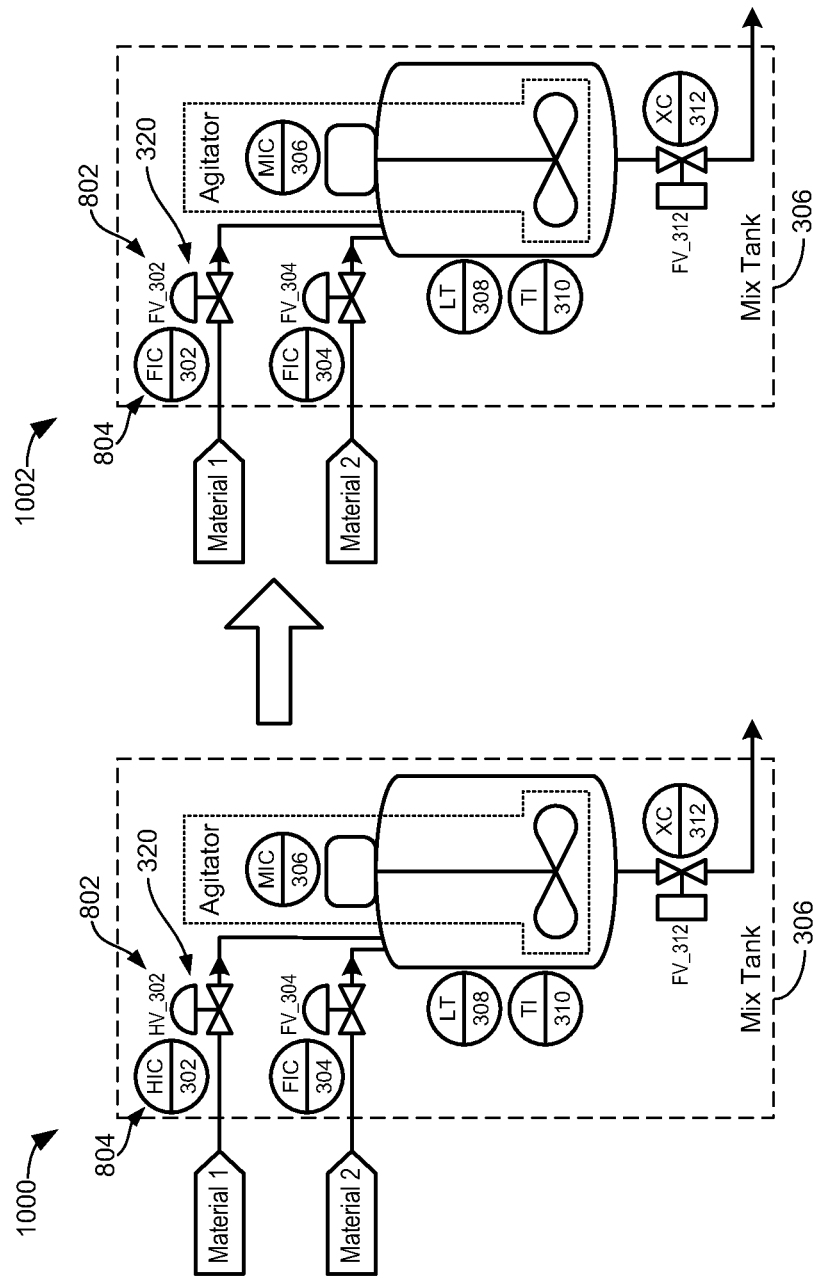
FIG. 10 illustrates a portion of the example process graphic of FIG. 3 before (left) and after (right) the modification of the example instance of FIG. 9.

Additionally or alternatively, in some examples, the process graphics associated with the modified portions of the generic process system library 500 are also changed. For example, FIG. 10 shows a process graphic 1000 corresponding to the mix tank equipment module 306 of the example process graphic 800 of FIG. 8 before the example modification described above and a second process graphic 1002 corresponding to the mix tank equipment module 306 after the valve 320 is modified to be incorporated into an automatic control loop. As shown in the illustrated example, the process graphics 1000, 1002 are identical except that the device tag name 802 and the device tag circular icon 804 associated with the first reagent valve 320 is changed to reflect the proper ISA letters identifying the valve 320 as part of the automatically controlled loop.

Accordingly, in accordance with the teachings disclosed herein, an instance of a generic process system library may be modified and/or updated to be adapted to variations in particular process control systems for which the generic process system library is being used. In this manner, the time and expense of configuring multiple process control systems (e.g., for different projects) is significantly reduced because most, if not all, of a generic process system library is reusable.

Further, where some portion of the generic process system library is inapplicable to the particular process control system being configured, the instance of the generic process system library can be modified based on other generic library definitions. In some examples, the generic library database 208 may not contain a particular generic library definition needed to configure a particular process control system. In such examples, the particular instance of the generic process system library may be configured (e.g., modified) using traditional techniques of configuring a process control system. That is, an engineer may create a process graphic that represents the modified portion of the process equipment and/or process signals, modify any corresponding control strategy, and individually update device tags as needed to bind the process graphics and/or control strategy with the equipment in the physical world. Although time is consumed in the configuration process with respect to the modified portion of the generic process system library, the rest of the generic process system library is still available to the engineer, thereby saving time in configuring the rest of the system. In some examples, modifications to an instance of the generic process system library do not affect the underlying generic process system library. That is, while the instance of the generic process system library is modified, the generic process system library is not modified. In some examples, the modifications to the instance of the generic process system library may be used to modify the original generic process system library and/or to create a new generic process system library. In this manner, the newly created generic process system library can be used going forward to configure other similar process systems without having to modify or update each new instance created when a different process control system is to be configured. Furthermore, in some examples, any fully configured process control system may serve as the basis for creating a generic process system library. That is, once a particular process control system is fully configured, the process-specific and/or project-specific information may be abstracted out to generate a new generic process system library Flowcharts representative of example methods for implementing the operator station 104 of FIG. 2 are shown in FIGS. 11-14. In this example, the methods may be implemented using machine readable instructions that comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 11-14, many other methods of implementing the example operator station 104 may alternatively be used. For example, the order of execution of the blocks may be changed, and/or some of the blocks described may be changed, eliminated, or combined.

As mentioned above, the example methods of FIGS. 11-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 11-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 11-14 are flowcharts representative of an example methods for implementing the example operator station 104 of FIGS. 1 and/or 2 to configure a particular process control system (e.g., the process control system 100 of FIG. 1) based on a generic process system library (e.g., the generic process system library 500). The method of FIG. 11 begins at block 1100 where the example process control application 206 receives a request to configure a process control system based on a generic process system library.

At block 1102 the example instance generator 210 retrieves the requested generic process system library from the generic library database 208. At block 1104 the example instance generator 210 requests inputs corresponding to the particular process control system for generic placeholders (e.g., the generic placeholders 612, 614, 908) in the generic process system library. In some examples, the inputs for the generic placeholders are used to define process-specific details of the process control system. For example, the generic placeholders may define the specific tag names for devices within the process control system, the specific control strategies of the process control system (e.g., how process signals are to be computed and/or used), and/or the specific graphical elements unique to a process graphic representative of the particular process control system. At block 1106 the example instance generator 210 determines whether inputs for all of the generic placeholders have been received. If the example instance generator 210 determines the inputs have not been received for all placeholders, control returns to block 1104. If the example instance generator 210 determines the inputs have been received for all placeholders, control advances to block 1108.

At block 1108, the example instance generator 210 generates an instance of the generic process system library to configure the particular process control system. In some examples, the instance of the generic process system library is a fully configured process control system (or a fully configured portion of the process control system corresponding to the generic process system library). Additional details associated with generating an instance of the generic process system library are described below in connection with the example method of FIG. 12.

At block 1110 the process control application 206 determines whether there are changes to be made to the instance of the generic process system library. In some examples, the process control application 206 determines that changes are to be made to the instance of the generic process system library based upon user input. For example, a user may select a particular portion and/or item within the instance for modification and/or replacement. If the process control application 206 determines that there are changes to be made to the instance of the generic process system library, control advances to block 1112 where the instance generator 210 modifies the instance of the generic process system library based on a variation in the particular process control system. Additional details associated with modifying the instance of the generic process system library are described below in connection with the example method of FIG. 13. Once the instance of the generic process system library has been modified (block 1112), the example method of FIG. 11 ends. Returning to block 1110, if the process control application 206 determines that there are no changes to be made to the instance of the generic process system library, the example method ends.

Figure 11:
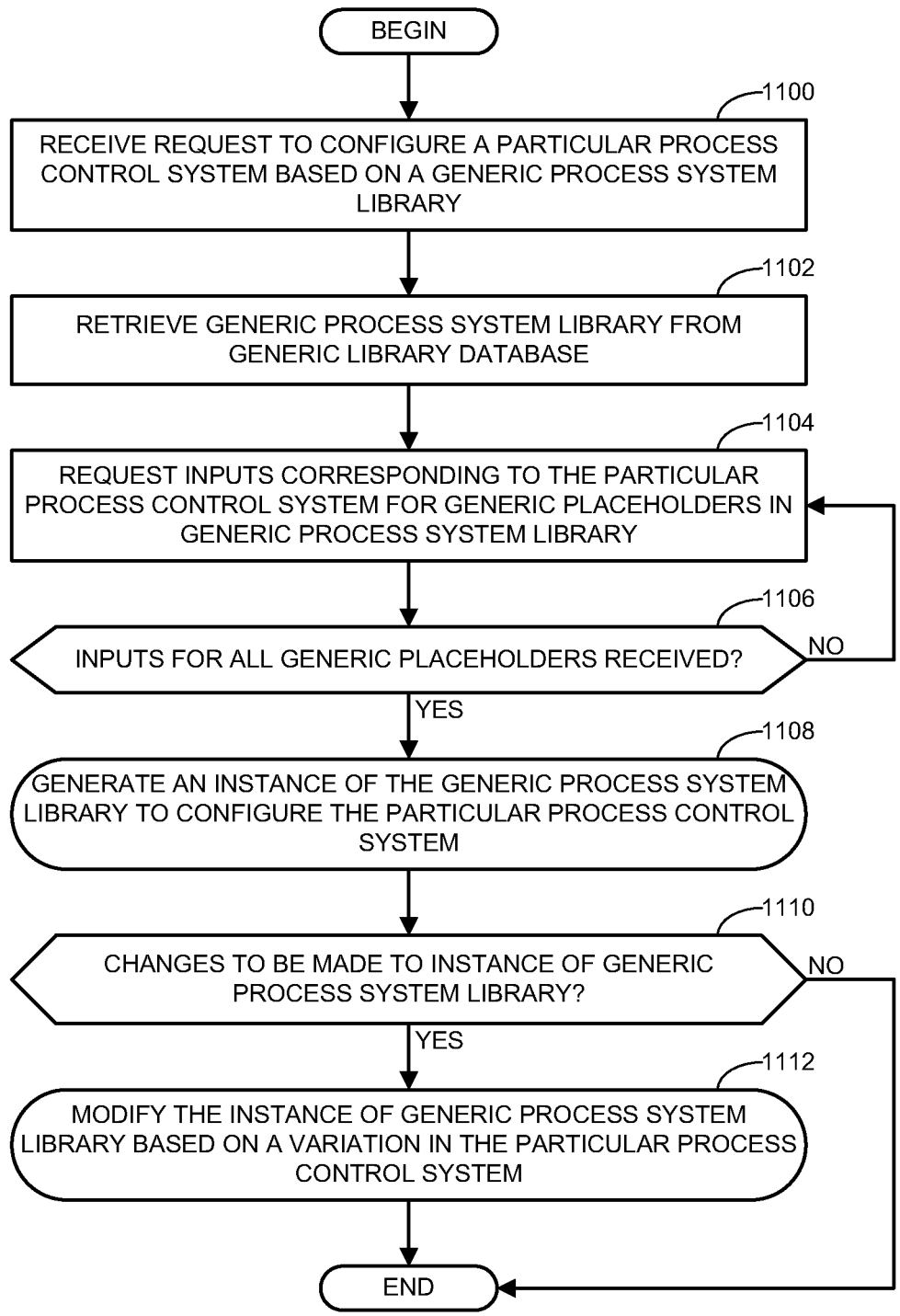
FIGS. 11-13 are flowcharts representative of an example process for implementing the example operator station 104 of FIGS. 1 and/or 2 to configure a particular process control system in accordance with the teachings disclosed herein.
Figure 12:
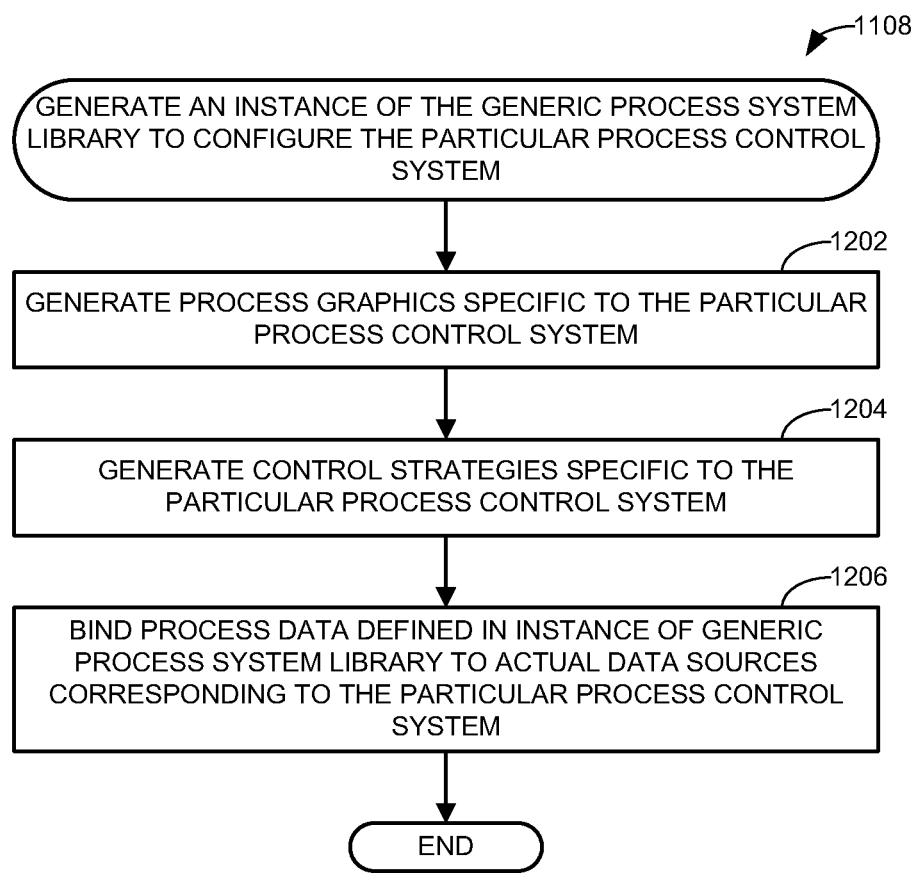

FIG. 12 illustrates an example method with additional detail for implementing block 1108 of the example method of FIG. 11 to generate an instance of a generic process system library to configure a particular process control system. The example method of FIG. 12 begins at block 1202 where the example process control application 206 generates process graphics specific to the particular process control system. In some examples, the process graphics are based on generic process graphics associated with the generic process system library retrieved from the generic library database 208 via the instance generator 210. In some examples, the process graphics are generated from a single image that represents the entire process control system. In other examples, the process graphics are generated from multiple images corresponding to multiple subcomponents of the process control system. In some examples, the generated process graphics are specific to the particular process control system because the process control application assigns the inputs (received at block 1104 of FIG. 11) to the placeholders of the generic process system library. In this manner, the process-specific information associated with the particular process control system may be incorporated into the process graphics as provided in the generic process system library.

At block 1204 the example process control application 206 generates control strategies specific to the particular process control system. In some examples, the control strategies are based on generic control strategies associated with the generic process system library retrieved from the generic library database 208 via the instance generator 210. In some examples, the generated control strategies are specific to the particular process control system because the process control application assigns the inputs (received at block 1104 of FIG. 11) to the placeholders of the generic process system library. In this manner, the process-specific information associated with the particular process control system may be incorporated into the control strategies as provided in the generic process system library.

At block 1206 the example process control application 206 binds process data defined in the instance of the generic process system library to actual data sources associated with the particular process control system. In some examples, the process data defined in the instance of the generic process system library is bound to the actual data sources because of the inputs assigned to the generic placeholders as described above. Once the process data defined in the instance of the generic process system library is bound to the actual data sources the example method of FIG. 12 ends.

Figure 13:
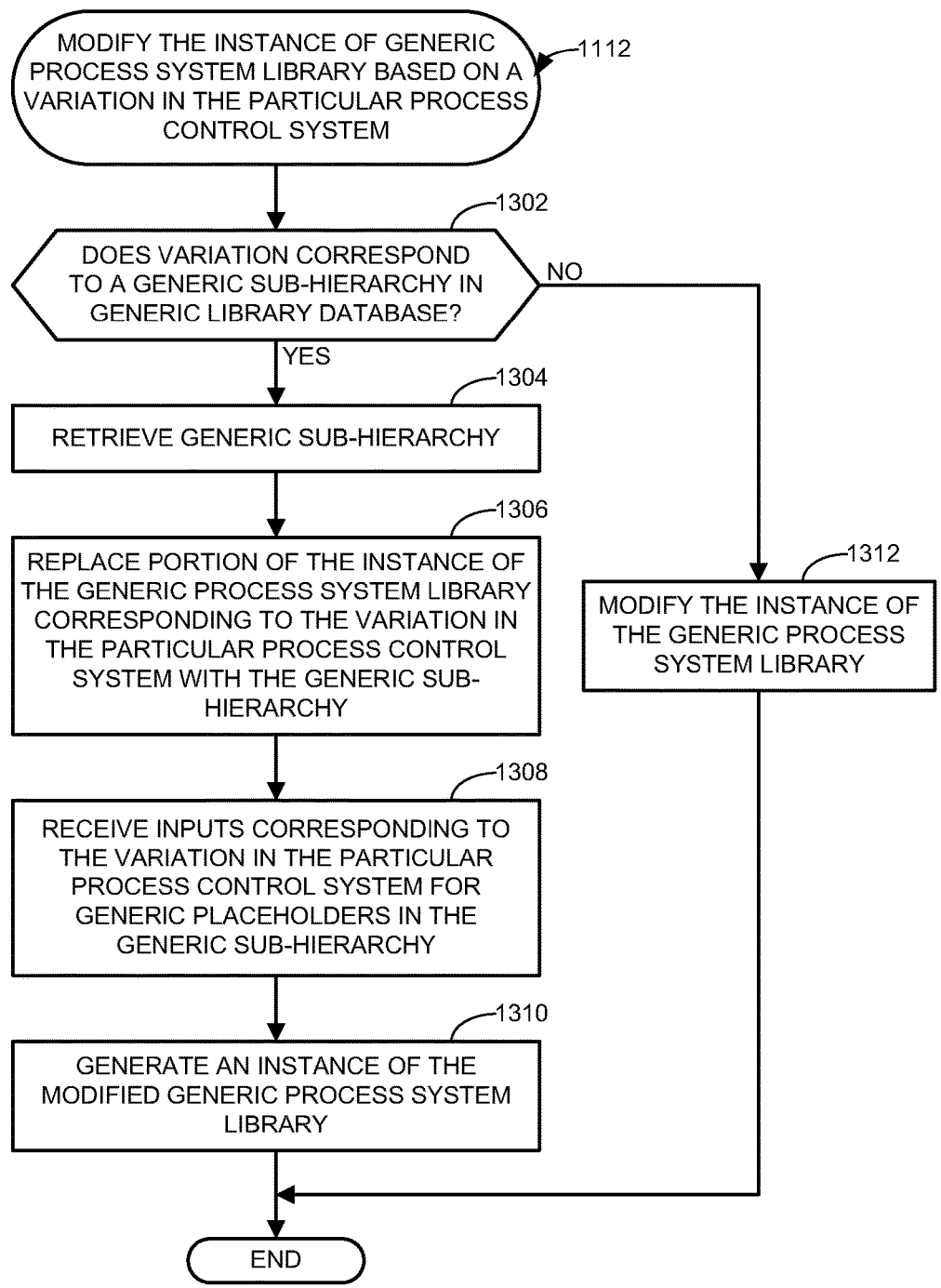

FIG. 13 illustrates an example method with additional detail for implementing block 1112 of the example method of FIG. 11 to modify the instance of the generic process system library based on a variation in the particular process control system. The example method of FIG. 13 begins at block 1302 where the example instance generator 210 determines whether the variation corresponds to a generic sub-hierarchy in the generic library database 208. If the example instance generator 210 determines that the variation does correspond to a generic sub-hierarchy in the generic library database 208, control advances to block 1304 where the example instance generator 210 retrieves the generic sub-hierarchy.

At block 1306 the instance generator 210 replaces a portion of the instance of the generic process system library corresponding to the variation in the particular process control system with the generic sub-hierarchy. At block 1308 the example instance generator 210 receives inputs for generic placeholders (e.g., the generic placeholders 612, 614, 908) in the generic sub-hierarchy corresponding to the variation in the particular process control system. In some examples, the generic placeholders may be the same as the generic placeholders of the generic process system library. In such examples, the inputs requested at block 1104 may be used rather than receiving new inputs. In some examples, where the generic placeholders of the generic sub-hierarchy are different than the placeholders of the generic process system library, the inputs are received in the same manner as described above in connection with blocks 1104 and 1106 of FIG. 11. At block 1310 the example instance generator 210 generates an instance of the modified generic process system library at which point the example method of FIG. 13 ends.

Returning to the block 1302, if the example instance generator 210 determines that the variation does not correspond to a generic sub-hierarchy in the generic library database 208, control advances to block 1312 where the example process control application 206 modifies the instance of the generic process system library. That is, rather than modifying the generic process system library with a generic sub-hierarchy to then generate an updated instance, in some examples where there is no generic sub-hierarchy corresponding to the variations in the particular process control system the instance of the generic process system library may be modified or reconfigured directly. In such examples, the reconfiguration process follows known configuration techniques. For example, where a generic sub-hierarchy does not exist or is otherwise unavailable (e.g., not stored in the generic library database 208), a user may still configure the particular process control system using known methods based on individual inputs defining each device, each device tag name, and each relationship between process signals and/or process equipment in the particular process control system. Once the instance of the process control system is modified, the example method of FIG. 12 ends.

Figure 14:
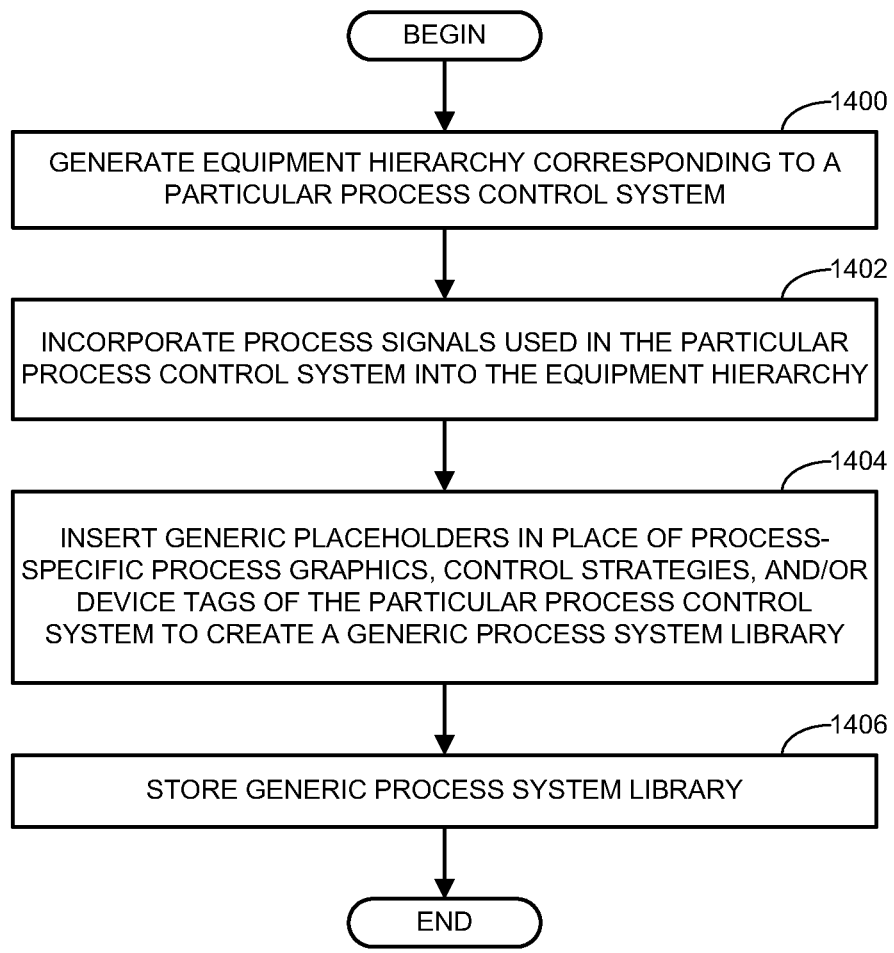
FIG. 14 is a flowchart representative of an example process for implementing the example operator station 104 of FIGS. 1 and/or 2 to create a generic process system library in accordance with the teachings disclosed herein

FIG. 14 is a flowchart representative of an example process for implementing the example operator station 104 of FIGS. 1 and/or 2 to create a generic process system library. The method of FIG. 14 begins at block 1400 where the example generic library generator 212 generates an equipment hierarchy corresponding to a particular process control system. In some examples, the equipment hierarchy is the framework on which the generic process system library is created. In some examples, levels in the equipment hierarchy correspond to the levels or components of a process control system (e.g., plant, area, unit, process cell, equipment module, control module, etc.). Additionally or alternatively, the equipment hierarchy corresponds to only a portion of the particular process control system (e.g., a particular process cell, a skid, a toolkit, etc.) and any associated process equipment at lower levels. In some examples, each item in the equipment hierarchy is associated with a particular graphical element and/or process graphic representative of the corresponding process equipment. In some examples, the process graphic associated with higher level items in the equipment hierarchy correspond to a single image or graphic representative of all equipment in lower levels of the hierarchy beneath the corresponding higher level item. In other examples, process graphic associated with higher level items in the equipment hierarchy correspond to a combination of multiple images or graphics corresponding to the individual items beneath the higher level item. In some examples, each item within the equipment hierarchy is also associated with a unique tag name to particularly identify each item of process equipment relative to the other items. Additionally or alternatively, each item of process equipment is associated with a generic or descriptive label or title. In some such examples, multiple items of process equipment may have the same descriptive label (e.g., control valve). However, because each item of process equipment is organized within an equipment hierarchy the individual items at different locations within the hierarchy are still distinguishable.

In some examples, the equipment hierarchy is generated based on an existing and previously configured process control system. That is, the generic library generator 212 identifies the process equipment and corresponding process graphics, tag names, and/or descriptive labels within a previously configured process control system and places each item of process equipment in its respective place within the equipment hierarchy. In other examples, the equipment hierarchy may be user defined (e.g., an engineer defines the equipment and the hierarchy associated with the equipment) without regard to the particular process control system actually having been assembled and/or configured.

At block 1402 the example generic library generator 212 incorporates process signals used in the particular process control system into the equipment hierarchy. In some examples, as with the process equipment, each of the process signals is associated with a unique tag name to be identified relative to all other process signals and/or process equipment. Additionally or alternatively, each process signal is associated with a generic or descriptive label or title as described above. Furthermore, in some examples, each of the process signals is associated with corresponding control strategies that define the working relationship between separate process signals and/or process equipment. Similar to the process equipment, in some examples, the process signals and the corresponding tag names, descriptive labels, and/or control strategies incorporated into the equipment hierarchy are identified based on the process signals and related information in an existing and/or configured process control system. In other examples, the process signals and related information are user defined independently of any existing process control system.

At block 1404 the example generic library generator 212 inserts generic placeholders in place of process-specific information corresponding to process graphics, control strategies, and/or tag names of the particular process control system to create a generic process system library. In some examples, the process-specific information to be abstracted out and replaced with generic placeholders is identified automatically based on predefined rules (e.g., defined by a user, a developer of the process control application 206, and/or a manufacturer of components of the process control system (e.g., a vendor of a skid or toolkit)). For example, if the first three characters of every tag name designate the area of the process control system in which the corresponding process equipment and/or process signal is located, a rule might dictate that the first three characters of all tag names are replaced with the generic placeholder of "~area~" in the manner illustrated in connection with FIG. 6. In some examples, a user may identify the information to be replaced with a generic placeholder. Further, in some examples, the amount or level of information rendered generic via generic placeholders is user defined. For example, a user may designate a generic placeholder for the loop prefix of a loop number in a tag name but keep the particular loop number for the tag name (e.g., see the generic process system library 500 shown in FIG. 9). In other examples a user may designate separate generic placeholders for the loop prefix and the loop number (e.g., see the generic library definition 904 shown in FIG. 9). At block 1406 the example generic library database 208 stores the generic process system library, at which point the example method of FIG. 14 ends.

Figure 15:
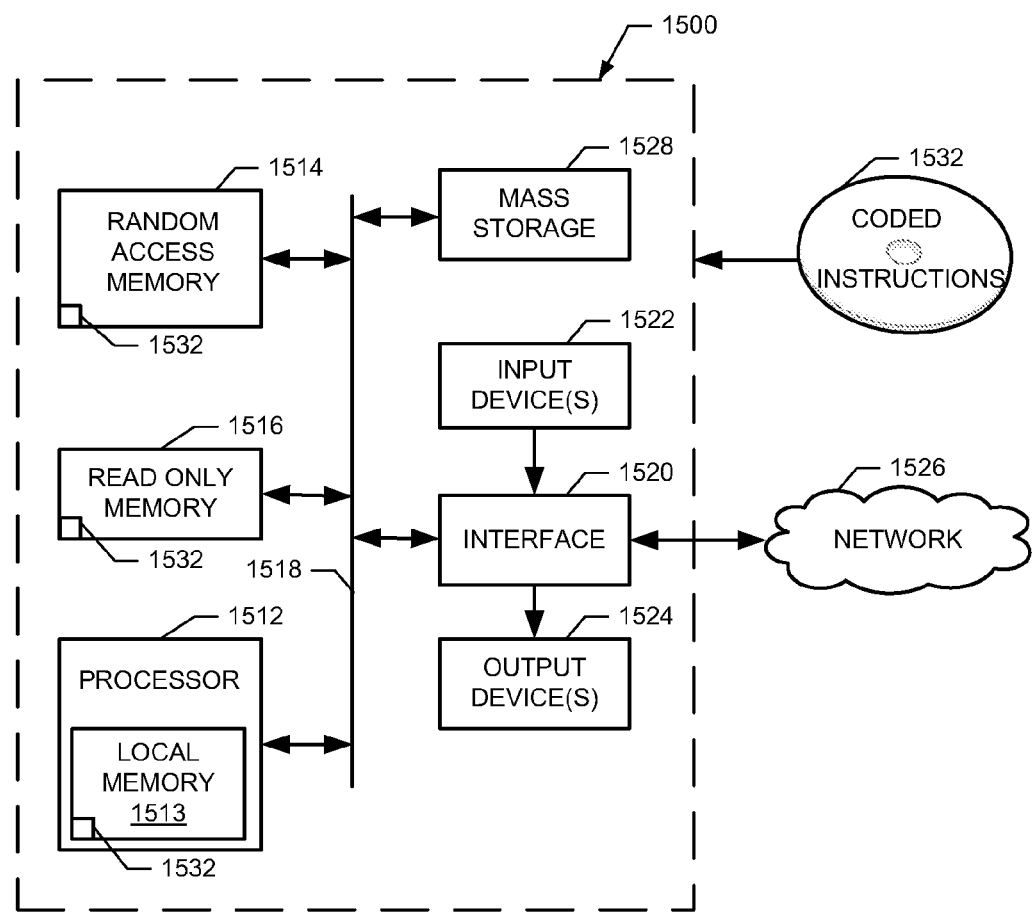
FIG. 15 is a schematic illustration of an example computer that may be used and/or programmed to carry out the example process of FIGS. 11-14 and/or, more generally, to implement the example operator station of FIG. 1 and/or FIG. 2.

FIG. 15 is a block diagram of an example processor platform 1500 capable of executing instructions to implement the methods of FIGS. 11-14 and the operator station 104 of FIGS. 1 and/or 2. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the methods of FIGS. 11-14 may be stored in the mass storage device 1528, in the volatile memory 1514, in the non-volatile memory 1516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:

instantiating an instance of a generic process system library, the generic process system library being a fillable template including representations of interconnected equipment items included in a process control system, the equipment items generating corresponding process signals, the generic process system library comprising generic process graphic data and generic control strategy data, the generic process graphic data including graphical representations of the equipment items and graphical representations of the corresponding process signals arranged in a hierarchy, the generic control strategy data including generic placeholders arranged in the hierarchy;

requesting process specific data associated with the operation of the process control system to modify the generic placeholders;

determining whether the process specific data received are sufficient to modify the generic placeholders; and configuring the instance of the generic process system library by incorporating the process specific data with the generic placeholders to generate a process specific control strategy from the generic control strategy data and to generate a process specific graphic from the generic process graphic data, the process specific data including specific tag name data used to modify generic tag names for the equipment items to specific tag names and specific process variables of the equipment items used to modify generic process signal fields to specific process signals, the specific tag names being assigned to the graphical representations of the equipment items and the specific process signals being assigned to the graphical representations of the corresponding process signals.

2. The method of claim 1, further comprising configuring the instance by:

defining the specific tag names and the specific process signals of the equipment items based on the generic tag names and the generic process signal fields respectively and a value to be assigned by a user when instantiating the instance; and binding the instance to the equipment items based on the specific tag names and the specific process signals.

3. The method of claim 2, wherein the equipment items and the process signals correspond to an area within the process control system, a first one of the generic placeholders comprising an area identifier to identify the area within the process control system and a second one of the generic placeholders comprising a loop prefix identifier to identify a loop associated with the area within the process control system.

4. The method of claim 2, further comprising:

displaying the process specific graphic; and displaying the specific tag names and the specific process signals in the process specific graphic.

5. The method of claim 4, further comprising:

removing the specific tag names from the process specific graphic; and displaying descriptive labels indicative of the equipment items in place of the removed specific tag names, the descriptive labels defined by the generic process system library.

6. The method of claim 1, wherein the process specific control strategy is associated with at least one of the equipment items and at least one of the process signals.

7. The method of claim 1, wherein the process control system corresponds to a safety instrumented system and the process specific control strategy includes a safety instrumented function.

8. The method of claim 1, wherein configuring the instance of the generic process system library by incorporating the process specific data associated with the operation of the process control system with the generic placeholders includes assigning an input to one of the generic placeholders, the input to define a path to a source of data from the process control system.

9. The method of claim 1, further comprising:
adjusting at least one of the specific tag names associated with the instance, the process specific graphic associated with the instance, or the process specific control strategy associated with the instance; and
updating the instance based on the at least one of the adjusted specific tag name, the adjusted process specific graphic, or the adjusted process specific control strategy.

10. The method of claim 1, wherein the generic process graphic data and the generic control strategy data are structured within the generic process system library according to a hierarchical relationship of the equipment items and the process signals of the process control system.

11. A tangible computer readable storage medium comprising instructions that, when executed cause a machine to at least:
instantiate an instance of a generic process system library, the generic process system library being a fillable template including representations of interconnected equipment items included in a process control system, the equipment items generating corresponding process signals, the generic process system library including generic process graphic data and generic control strategy data, the generic process graphic data including graphical representations of the equipment items and graphical representations of the corresponding process signals arranged in a hierarchy, the generic control strategy data including generic placeholders arranged in the hierarchy;
request process specific data associated with the operation of the process control system to modify the generic placeholders;
determine whether the process specific data received are sufficient to modify the generic placeholders; and
configure the instance to operate the equipment items of the process control system by incorporating the process specific data with the generic placeholders to generate a process specific control strategy from the generic control strategy data and to generate a process specific graphic from the generic process graphic data, the process specific data including specific tag name data used to modify generic tag names for the equipment items to specific tag names and specific process variables of the equipment items used to modify generic process signal fields to specific process signals, the specific tag names being assigned to the graphical representations of the equipment items and the specific process signals being assigned to the graphical representations of the corresponding process signals.

12. The computer readable storage medium of claim 11, wherein the instructions further cause the machine to:
define the specific tag names and the specific process signals based on the generic tag names and the generic process signal fields respectively and a value to be assigned by a user when instantiating the instance; and
bind the instance to the equipment items based on the specific tag names and the specific process signals.

13. The computer readable storage medium of claim 12, wherein the instructions further cause the machine to:
display the process specific graphic; and
display the specific tag names and the specific process signals in the process specific graphic.

14. The computer readable storage medium of claim 11, wherein the instructions to configure the instance to operate equipment items of the process control system by incorporating process specific data with the generic placeholders further cause the machine to associate the process specific control strategy with at least one of the equipment items and at least one of the process signals.

15. The computer readable storage medium of claim 11, wherein the instructions further cause the machine to:
adjust at least one of the specific tag names associated with the instance, the process specific graphic associated with the instance, or the process specific control strategy associated with the instance; and
update the instance based on the at least one of the adjusted specific tag name, the adjusted process specific graphic, or the adjusted process specific control strategy.

16. An apparatus comprising:
a generic library database to store a generic process system library, the generic process system library being a fillable template including representations of interconnected equipment items included in a process control system, the equipment items generating corresponding process signals, the generic process system library comprising generic graphic data and generic control strategy data, the generic graphic data including graphical representations of the equipment items and graphical representations of the corresponding process signals arranged in a hierarchy, the generic control strategy data including generic placeholders arranged in the hierarchy; and
an instance generator to:
request process specific data associated with the operation of the process control system to modify the generic placeholders,
determine whether the process specific data received are sufficient to modify the generic placeholders, and
generate an instance of the generic process system library by incorporating the process specific data with the generic placeholders to generate a process specific control strategy from the generic control strategy data and to generate a process specific graphic from the generic graphic data, the process specific data including specific tag name data used to modify generic tag names for the equipment items to specific tag names and specific process variables of the equipment items used to modify generic process signal fields to specific process signals, the specific tag names being assigned to the graphical representations of the equipment items and the specific process signals being assigned to the graphical representations of the corresponding process signals.

17. The apparatus of claim 16, wherein the generic graphic data and the generic control strategy data are organized within the generic process system library according to a hierarchical relationship of the equipment items and corresponding process signals of the process control system.

18. The apparatus of claim 16, wherein the specific tag names are based on the generic tag names and the specific process signals are based on the generic process signal fields.

19. The apparatus of claim 18, wherein at least one of the specific tag names or the specific process signals is based on a user defined value specific to the configuration of the instance of the process control system.

20. The apparatus of claim 16, wherein the generic process system library comprises different generic library definitions comprising portions of the generic graphic data and portions of the generic control strategy data corresponding to different portions of the process control system.

* * * * *